(12) United States Patent
Honma et al.

(10) Patent No.: US 7,412,145 B2
(45) Date of Patent: Aug. 12, 2008

(54) OPTICAL FIBER CONNECTING TOOL

(75) Inventors: Toshihiko Honma, Kanagawa (JP); Masahiro Hasegawa, Kanagawa (JP); Hideyuki Kinpara, Kanagawa (JP); Hidenori Takahashi, Kanagawa (JP); Isao Nakagaki, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/545,894

(22) PCT Filed: Feb. 17, 2003

(86) PCT No.: PCT/JP03/01640

§ 371 (c)(1),
(2), (4) Date: Aug. 17, 2005

(87) PCT Pub. No.: WO2004/072703

PCT Pub. Date: Aug. 26, 2004

(65) Prior Publication Data

US 2006/0153515 A1    Jul. 13, 2006

(51) Int. Cl.
G02B 6/00    (2006.01)

(52) U.S. Cl. ........................................... 385/134
(58) Field of Classification Search ............... None
See application file for complete search history.

(56) References Cited

U.S. PATENT DOCUMENTS 6,918,704 B2 *    7/2005    Marrs et al. .................... 385/78

FOREIGN PATENT DOCUMENTS

| JP | 9-73023 A | | 3/1997 |
|---|---|---|---|
| JP | 9-96735 A | | 4/1997 |
| JP | 10-160957 A | | 6/1998 |
| JP | 10332974 A | * | 12/1998 |
| JP | 11-160563 A | | 6/1999 |
| JP | 2002-23006 A | | 1/2002 |
| JP | 2002023006 | * | 1/2002 |
| JP | 2002023006 A | * | 1/2002 |
| JP | 2002-55259 A | | 2/2002 |
| JP | 2002-71999 A | | 3/2002 |

* cited by examiner

*Primary Examiner*—Sung Pak
*Assistant Examiner*—Hoang Tran
(74) *Attorney, Agent, or Firm*—McDermott Will & Emery LLP

(57) ABSTRACT

An optical fiber connection jig which is small in size, lightweight and excellent in portability, simple in structure, can be produced at a low cost, and enables an optical fiber-connecting operation at the field to be carried out easily and positively. The optical fiber connection jig includes a jig body having wedge pieces which are fitted respectively into wedge insertion slits in a splice member by a grasping operation for a pair of left and right grasp frames opposed to each other with the splice member disposed therebetween, thereby forcibly expanding an optical fiber holding groove, and a fiber insertion guide which is mounted on the jig body, and guides a coated optical fiber generally onto a center axis of the optical fiber holding groove by a coated fiber guide groove extending in a direction of the center axis Y1 of the optical fiber holding groove.

14 Claims, 27 Drawing Sheets

OPTICAL FIBER CONNECTING TOOL

RELATED APPLICATION

This is a U.S. national phase application of PCT International Application PCT/JP2003/001640, filed on Feb. 17, 2003, the disclosure of which application is incorporated by reference herein.

TECHNICAL FIELD

This invention relates to an optical fiber connection jig, and more specifically to an improvement which enables a connector connecting operation to be easily carried out at a low cost at an optical fiber installation field.

BACKGROUND ART

An SC-type optical connector has heretofore been developed for the purpose of building an optical communication network.

This SC-type optical connector has as a basic construction an alignment structure and a double fitting structure which are achieved by a zirconia ferrule which can be assembled even in the field, and this optical connector has been used mainly for the connection of a single-core cable of a silica-type single-mode optical fiber.

Recently, a mechanical splice-type connector which is an improvement of this SC-type optical connector has been developed.

This mechanical splice-type connector has been developed in order to achieve a high-density mounting at a lower cost while securing the compatibility with a conventional SC-type optical connector.

FIGS. 40 to 43 show a conventional mechanical splice-type connector.

The mechanical splice-type connector 1 shown here is disclosed in JP-A-11-160563 publication, and comprises a ferrule 3 containing a first optical fiber 2, a splice member 4 which holds the ferrule 3 and the first optical fiber 2 projecting from a rear end surface of the ferrule 3, and a connector housing 23 of a generally tubular shape covering an outer periphery of this splice member 4. A second optical fiber 20, made bare at a distal end portion of a coated optical fiber 19, is inserted into the splice member 4 through a rear end thereof, and the first optical fiber 2 and the second optical fiber 20 are butted within the splice member 4, thereby connecting the second optical fiber 20 to the first optical fiber 2.

The connector housing 23 comprises a front housing 17 covering the outer periphery of a front end portion of the splice member 4, and a rear housing 18 covering the outer periphery of a rear end portion of the splice member 4. The front housing 17 and the rear housing 18 are joined together by engaging retaining piece portions 18a (formed on an end portion of one of the housings) in engagement holes 17a formed in an end portion of the other housing.

A coil spring 16 is provided within the connector housing 23, and presses the splice member 4, received within this connector housing, against a positioning wall 17b on the front end portion of the front housing 17 to thereby fix this splice member.

As shown in FIGS. 41 and 42, the splice member 4 includes a base member 5, a cover member 6 superposed on this base member 5, and first and second clamp members 14 and 15 which grip and fixedly hold the superposed base member 5 and cover member 6 in intimate contact with each other.

An optical fiber holding groove 8 in which the above-mentioned first optical fiber 2 and second optical fiber 20 are inserted is formed in a surface of the base member 5 on which the cover member 6 is to be superposed. This optical fiber holding groove 8 is a groove having a V-shaped transverse cross-section, and a width, depth, etc., of this groove are so determined that the optical fibers, introduced into the groove, can be held between an inner surface of the groove and the surface of the cover member 6.

A ferrule holding portion 7 for supporting the outer periphery of the ferrule 3 introduced into the base member 5 from the front side is formed at the front end of the base member 5.

A procedure of assembling the mechanical splice-type connector 1 is as follows.

The ferrule 3 is beforehand inserted into the front housing 17.

Then, as shown in FIGS. 41 and 42, the ferrule 3 is introduced into the base member 5 in such a manner that the first optical fiber 2, projecting from the distal end of the ferrule 3, is located in a front half portion of the optical fiber holding groove 8, and thereafter the cover member 6 is superposed on the base member 5. Then, the base member 5 and the cover member 6 are fixed and held in intimate contact with each other by the first and second clamp members 14 and 15, thus completing the splice member 4.

Then, the coil spring 16 and the rear housing 18 are fitted on the rear end portion of the splice member 4, and the rear housing 18 and the front housing 17 are engaged with each other, and are fixed together, thus providing the completed form shown in FIGS. 40 and 43.

The connection of the second optical fiber 20 to the mechanical splice-type connector 1 is effected at an optical fiber installation field or the like, using a special-purpose optical fiber connection jig.

Wedge insertion slits 4a and 4b for forcing the intimately-contacted surfaces of the base member 5 and cover member 6 apart from each other against urging forces of the first and second clamp members 14 and 15 are formed in side surfaces of the base member 5 and cover member 6 of the splice member 4, and the connector housing 23 has openings 15a and 15b through which the wedge insertion slits 4a and 4b are exposed.

The special-purpose optical fiber connection jig has wedge pieces 21 which are fitted into the wedge insertions slits 4a and 4b in the splice member 4 to form a gap between the base member 5 and the cover member 6 intimately contacted with each other as shown in FIGS. 44(a) and 44(b) so that the second optical fiber 20 can be easily inserted into the optical fiber holding groove 8 of the splice member 4 (see, for example, Patent Literature 1, Patent Literature 2).

(Patent Literature 1)

JP-A-9-96735

(Patent Literature 2)

JP-A-2002-71999

In a condition in which a gap is formed between the base member 5 and the cover member 6 of the splice member 4 by the special-purpose optical fiber connection jig, the second optical fiber 20, made bare at the distal end portion of the coated optical fiber 19, is introduced into the optical fiber holding groove 8 from the rear side of the splice member 4, and the first optical fiber 2 and the second optical fiber 20 are butted in the optical fiber holding groove 8. Then, when the wedge pieces 21 are withdrawn respectively from the wedge insertion slits 4a and 4b, the first optical fiber 2 and the second optical fiber 20 are held between the base member 5 and the cover member 6, and are fixed thereto, with their end surfaces abutting against each other, so that the first optical fiber 2 and the second optical fiber 20 are connected together.

However, in the optical fiber connection jig of the above Patent Literature 1, the wedge pieces and a wedge drive mechanism for advancing and retracting the wedge pieces by operating a lever are provided on a table top-type base for supporting and fixing the splice member, and therefore this jig has a large size and an increased weight, and therefore it is difficult to carry the jig. And besides, this jig has a problem that it can not be easily operated with one hand at the field or the like, and the poor handleability at the field and a high cost of the jig have been a cause for a dull demand of the mechanical splice-type connector itself.

With respect to a problem common to Patent Literature 1 and Patent Literature 2, there is not provided any guide member for accurately positioning the center axis of the optical fiber in the center axis of the optical fiber holding groove in the splice member when inserting the optical fiber into the optical fiber holding groove, and the operator must manually align the center axes of the two with each other while confirming this operation with the eyes, and therefore there has been encountered a problem that the efficiency of the operation is poor.

Furthermore, when the inserting operation is carried out with the center axis of the optical fiber disposed out of alignment with the center axis of the optical fiber holding groove, there has been a fear that the distal end of the optical fiber strikes against an edge of an opening of the optical fiber holding groove, so that the fiber distal end is subjected to chipping or the like. When the fiber distal end is thus chipped, it is necessary to carry out a restoration operation in which the chipped fiber distal end portion is removed, and the optical fiber distal end is trimmed. This becomes a cause for further lowering the efficiency of the operation.

This invention has been made in view of the above problems, and its object is to provide an optical fiber connection jig which is small in size, lightweight and excellent in portability, and besides is simple in structure, and can be produced at a low cost, and enables an optical fiber to be easily and positively inserted into an optical fiber holding groove in a splice member without imposing any burden of alignment or others on the operator when inserting the optical fiber into the optical fiber holding groove, and achieves excellent handleablity at the field so that an increased demand for mechanical splice-type connectors can be expected.

DISCLOSURE OF THE INVENTION

The present invention solves the above problems by adopting constructions of the following [1] to [12].

[1] An optical fiber connection jig used for inserting a coated optical fiber into an optical fiber holding groove in a splice member, characterized in that:
the jig comprises a jig body having a wedge piece which is advanced by a grasping operation, and is fitted into a wedge insertion slit in the splice member to forcibly expand the optical fiber holding groove, and a fiber insertion guide which is mounted on the jig body, and guides the coated optical fiber generally onto a center axis of the optical fiber holding groove by a coated fiber guide groove.

[2] An optical fiber connection jig according to the above [1], characterized in that the jig body comprises a pair of front and rear wedge pieces provided in corresponding relation respectively to optical fiber holding grooves formed respectively in front and rear end portions of the splice member, and a pair of front and rear division grasp frames which are separated from each other in a front-rear direction so that each of the wedge pieces can be independently forced into the wedge insertion slit by the grasping operation.

[3] An optical fiber connection jig according to the above [1] or [2], characterized in that the fiber insertion guide has the coated fiber guide groove which is spaced a predetermined distance from an open end of the optical fiber holding groove of the slice member in a direction of the center axis of the optical fiber holding groove, and the coated optical fiber is slid on the coated fiber guide groove, so that an optical fiber, made bare at a distal end portion of the coated optical fiber, is inserted and guided into the optical fiber holding groove.

[4] An optical fiber connection jig according to any one of the above [1] to [3], characterized in that the coated fiber guide groove of the fiber insertion guide is set to a size corresponding to a diameter of the fiber to be connected to the splice member, and the fiber insertion guide is detachably mounted on the jig body.

[5] An optical fiber connection jig according to any one of the above [1] to [4], characterized in that the fiber insertion guide is made of a transparent material.

[6] An optical fiber connection jig according to any one of the above [1] to [5], characterized in that a lid portion for preventing the coated optical fiber from being disengaged from the coated fiber guide groove during the insertion of the coated optical fiber into the optical fiber holding groove is provided at the fiber insertion guide.

[7] An optical fiber connection jig according to any one of the above [1] to [6], characterized in that the fiber insertion guide includes a slide mechanism by which a coated fiber guide block, having the coated fiber guide groove therein, can be moved along the direction of the center axis of the optical fiber holding groove.

[8] An optical fiber connection jig according to any one of the above [1] to [7], characterized in that the jig is provided with illumination means for illuminating a region around the optical fiber holding groove when the optical fiber is to be inserted into the optical fiber holding groove in the splice member.

[9] An optical fiber connection jig according to any one of the above [1] to [8], characterized in that the jig body is provided with an illumination lighting switch for causing the illumination means to be lighted soon after the grasping operation for the jig body is started so as to fit the wedge piece into the wedge insertion slit in a side surface of the splice member.

[10] An optical fiber connection jig according to the above [9], characterized in that the jig body includes a pair of left and right grasp frames which are disposed in opposed relation to each other with the splice member interposed therebetween, and can be displaced toward each other by the grasping operation, and the illumination lighting switch has a structure employing leaf springs whose contacts are brought into contact with each other when a spacing distance between the pair of left and right grasp frames, approaching each other, becomes smaller than a predetermined length.

[11] An optical fiber connection jig according to any one of the above [1] to [10], characterized in that a mechanical splice-type connector, holding a ferrule, is used as the splice member for connecting the coated optical fiber.

[12] An optical fiber connection jig used for inserting a coated optical fiber into an optical fiber holding groove in a splice member, characterized in that:
the jig comprises a pair of grasp frames which are spaced a predetermined distance from each other in opposed relation to each other, and can be displaced toward each other by a grasping operation, a splice holder which is provided between the grasp frames so as to position and fix the splice member, and a wedge piece which is formed on and projects from one of the grasp frames for being opposed to a wedge insertion slit in a side surface of the splice member fixed to the splice holder, and is fitted into the wedge insertion slit to forcibly expand the optical fiber holding groove when the grasping operation for the grasp frames is effected.

Figure 1:
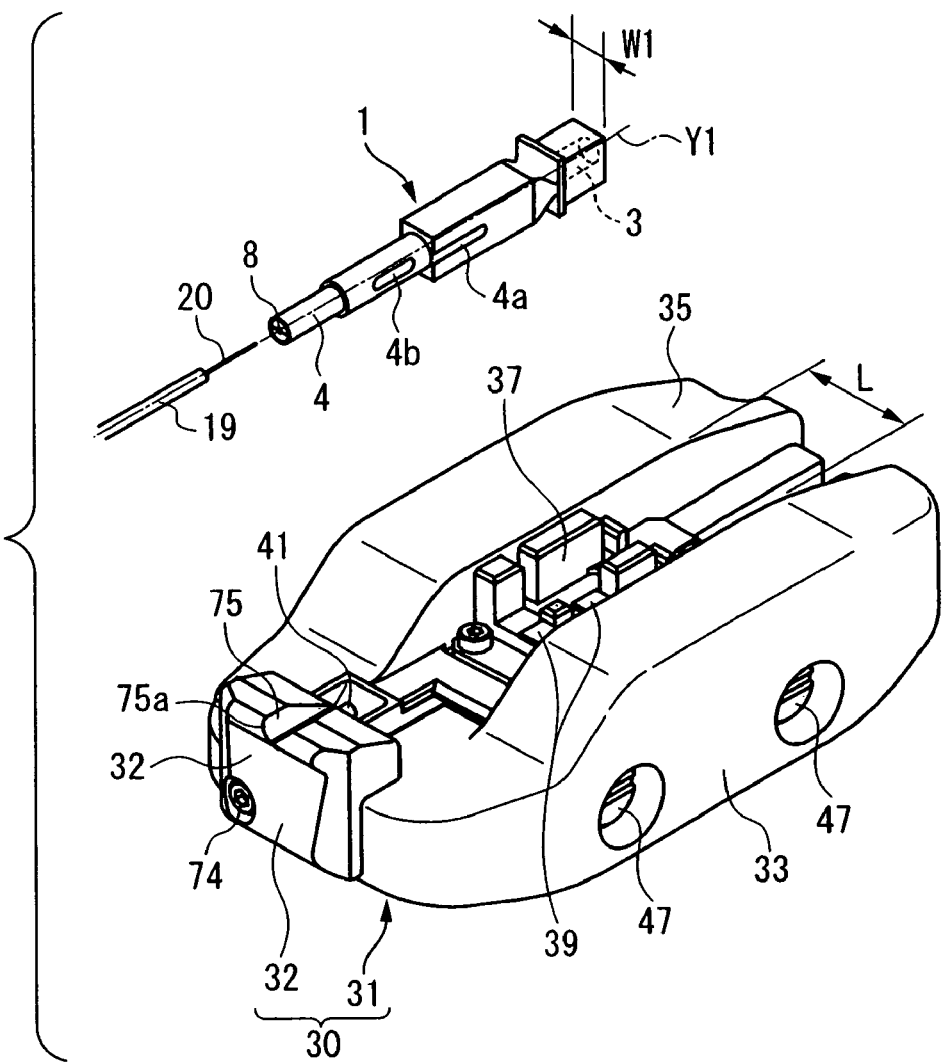
FIG. 1 is a perspective view showing a first embodiment of an optical fiber connection jig of the present invention.

With respect to reference numerals in the drawings, 1 denotes a mechanical splice-type connector, 2 an optical fiber, 3 a ferrule, 4 a splice member, 4a, 4b wedge insertion slits, 8 an optical fiber insertion groove, 19 a coated optical fiber, 20 an optical fiber, 30 an optical fiber connection jig, 31 a jig body, 32 a fiber insertion guide, 33, 35 grasp frames, 33d, 35d surfaces, 37 a splice holder, 39 a wedge piece, 41 illumination means, 43 an illumination lighting switch, 47 a guide shaft, 49 a leaf spring, 51 to 56 position limitation step portions, 53a, 54a tapering surfaces, 58, 59 leaf springs, 71 a strap hole, 74 a screw, 75 a coated fiber guide groove, 78 an optical fiber connection jig, 79 a fiber insertion guide, 80 a coated fiber guide groove, 82 an optical fiber connection jig, 83 a fiber insertion guide, 84 a coated fiber guide groove, 85, 86 guide blocks, 87 a lid portion, 89 a fiber insertion guide, 90, 91 guide blocks, 93 a coated fiber guide groove, 94 a lid portion, 96 an optical fiber connection jig, 97 a fiber insertion guide, 98 a guide block body, 99 a slide mechanism, 100 a coated fiber guide block, 101a coated fiber guide groove, 102 a pin, 103 a slot, 105 an optical fiber connection jig, 107 a jig body, 111, 112 grasp frames, 121, 122 division grasp frames, 125 an optical fiber connection jig, 127 a fiber insertion guide, 129 a coated fiber guide groove, 130 a fiber insertion guide, 131 a coated fiber guide groove, 135 a fiber insertion guide, 136 a coated fiber guide groove, and 140 a fiber insertion guide.

BEST MODE FOR CARRYING OUT THE INVENTION

A preferred embodiment of an optical fiber connection jig of the present invention will now be described in detail with reference to the drawings.

Figure 2:
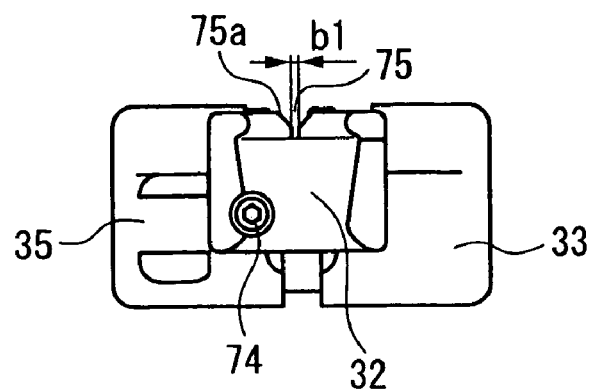
FIG. 2 is a front-elevational view of the optical fiber connection jig shown in FIG. 1.
Figure 3:
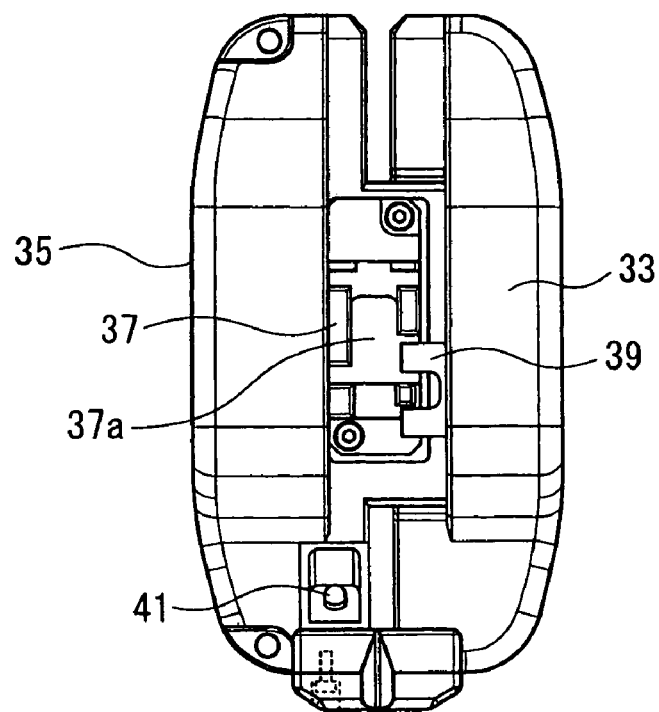
FIG. 3 is a plan view of the optical fiber connection jig shown in FIG. 1.

FIGS. 1 to 3 show the first embodiment of the optical fiber connection jig of the present invention.

This optical fiber connection jig 30 is used when an optical fiber 20, made bare at a coated optical fiber 19, is to be inserted into and connected to an optical fiber holding groove 8 in a rear end portion of a splice member 4 incorporated in a mechanical splice-type connector 1.

Figure 40:
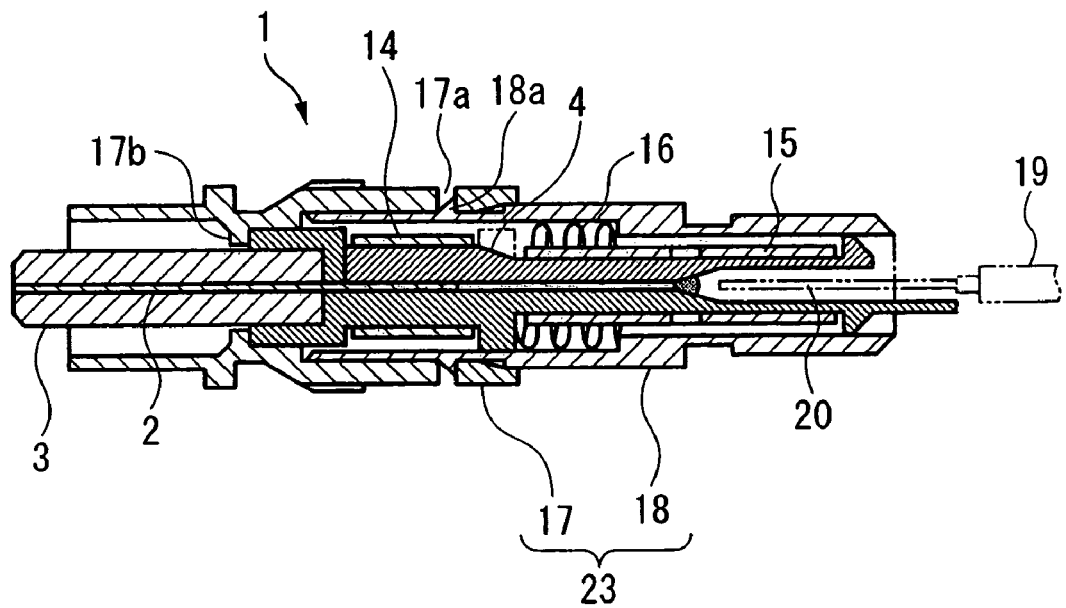
FIG. 40 is a vertical cross-sectional view of a mechanical splice-type connector.
Figure 41:
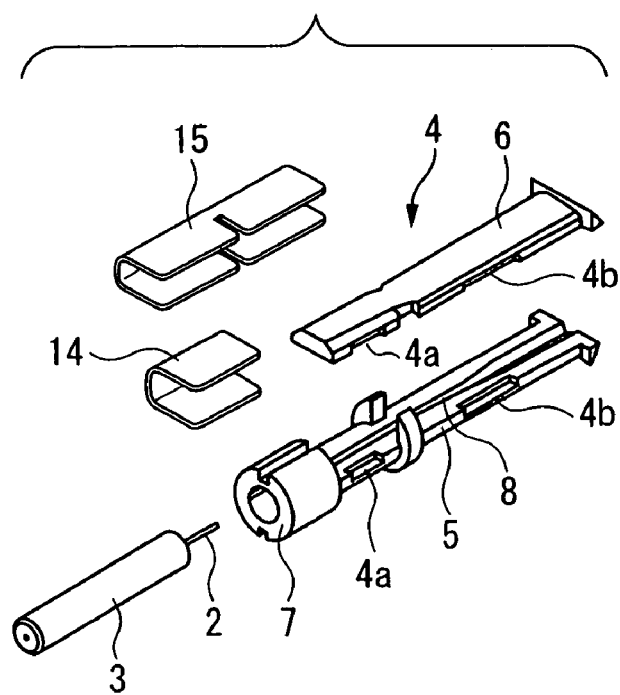
FIG. 41 is an exploded, perspective view of a splice member of the mechanical splice-type connector.
Figure 42:
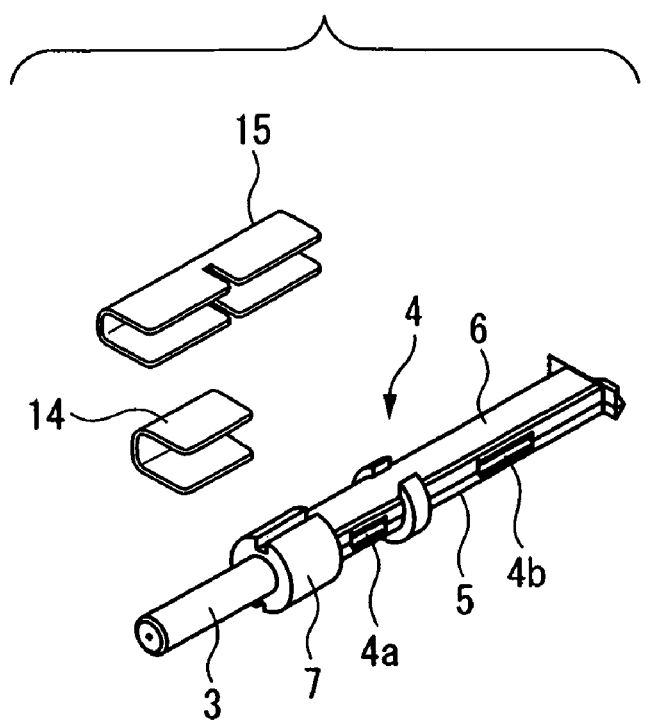
FIG. 42 is a perspective view showing a condition in which some of component parts of the splice member are assembled.
Figure 43:
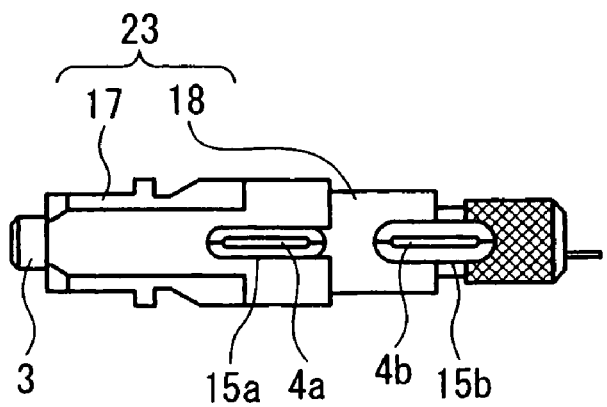
FIG. 43 is a side-elevational view of the mechanical splice-type connector shown in FIG. 40.
Figure 44:
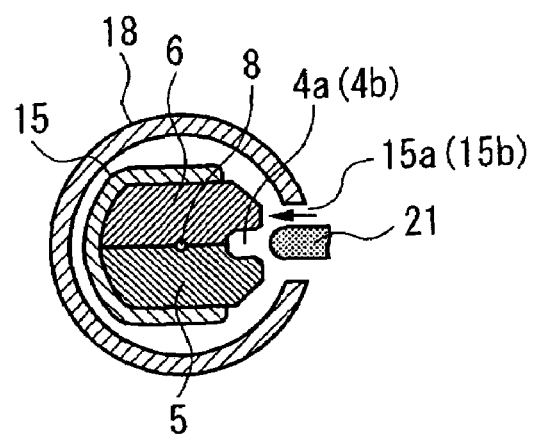
FIG. 44 shows a method of using an optical fiber connection jig, and (a) is a view showing a condition immediately before it is used, and (b) is a view showing a condition in which it is used.
Figure 44:
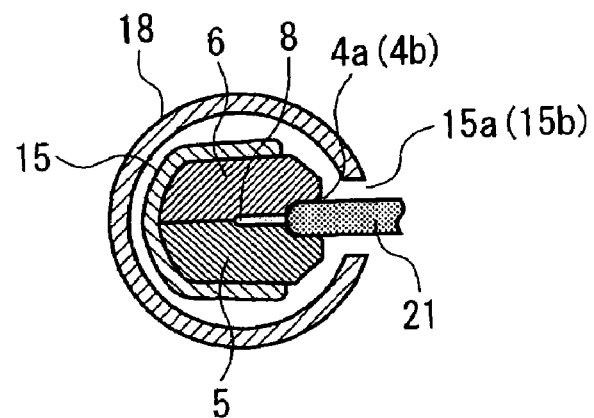

A ferrule 3 is beforehand attached to a front end portion of the splice member 4 as shown in FIG. 40.

The mechanical splice-type connector 1, the ferrule 3, the splice member 4, the coated optical fiber 19, the optical fiber 20, etc., are basically identical in construction to the existing products shown in FIGS. 40 to 43, and therefore will be designated by identical reference numerals, respectively, and explanation thereof will be simplified or omitted.

The optical fiber connection jig 30 of this embodiment comprises a jig body 31 so sized as to be grasped by the palm of the hand, and a fiber insertion guide 32 detachably mounted on a front side of this jig body 31.

The jig body 31 of this first embodiment comprises, as main portions, a pair of left and right grasp frames 33, 35 which are spaced a predetermined spacing distance L from each other in opposed relation to each other, and can be displaced toward each other when these grasp frames are grasped in the palm, a splice holder 37 which is disposed between these grasp frames 33, 35 so as to locate and fix the loaded splice member 4 in a predetermined position, and a pair of wedge pieces 39 which are formed on and project from an inner side surface of one grasp frame 33 for being opposed to wedge insertion slits 4a, 4b in a side surface of the splice member 4 loaded in the splice holder 37, and advance in a direction perpendicular to a longitudinal direction of the splice member 4 to be fitted respectively into the wedge insertion slits 4a, 4b to thereby forcibly expand the optical fiber holding groove 8 when the pair of grasp frames 33, 35 are grasped to be moved toward each other.

With respect to the thickness of the pair of wedge pieces 39 for fitting into the respective wedge insertion slits 4a, 4b to forcibly expand the optical fiber holding groove 8, the wedge piece 39 which is to be disposed at the front end portion of the splice member 4 so as to fit in the wedge insertion slit 4a is different from the wedge piece 39 which is to be disposed at the rear end portion of the splice member so as to fit in the wedge insertion slit 4b. Namely, the thickness is made larger for the wedge insertion slit 4a in the front end portion corresponding to a region where the optical fiber 20 is gripped and fixed, while taking a sheath thickness into consideration, the thickness is made smaller for the wedge insertion slit 4b in the rear end portion corresponding to a region where the coated optical fiber 19 is gripped and fixed.

Incidentally, in the case where the fiber diameter of the coated optical fiber to be connected to the splice member 4 is changed (for example, an outer diameter of a sheath is 0.25 mmφ and 0.9 mmφ), preferably, the pair of wedge pieces 39 are changed in thickness according to the coated optical fiber to be used so that the amount of opening of the splice member 4 can be optimized.

The jig body 31 further includes illumination means 41 for brightly illuminating the region around the optical fiber holding groove 8 when the optical fiber 20 is to be inserted into and connected to the optical fiber holding groove 8 in the splice member 4, and an illumination lighting switch 43 (see FIG. 6) for causing the illumination means 41 to be lighted soon after the grasping operation for the pair of grasp frames 33, 35 is started so as to insert the optical fiber 20 into the optical fiber holding groove 8 in the splice member 4.

Figure 4:
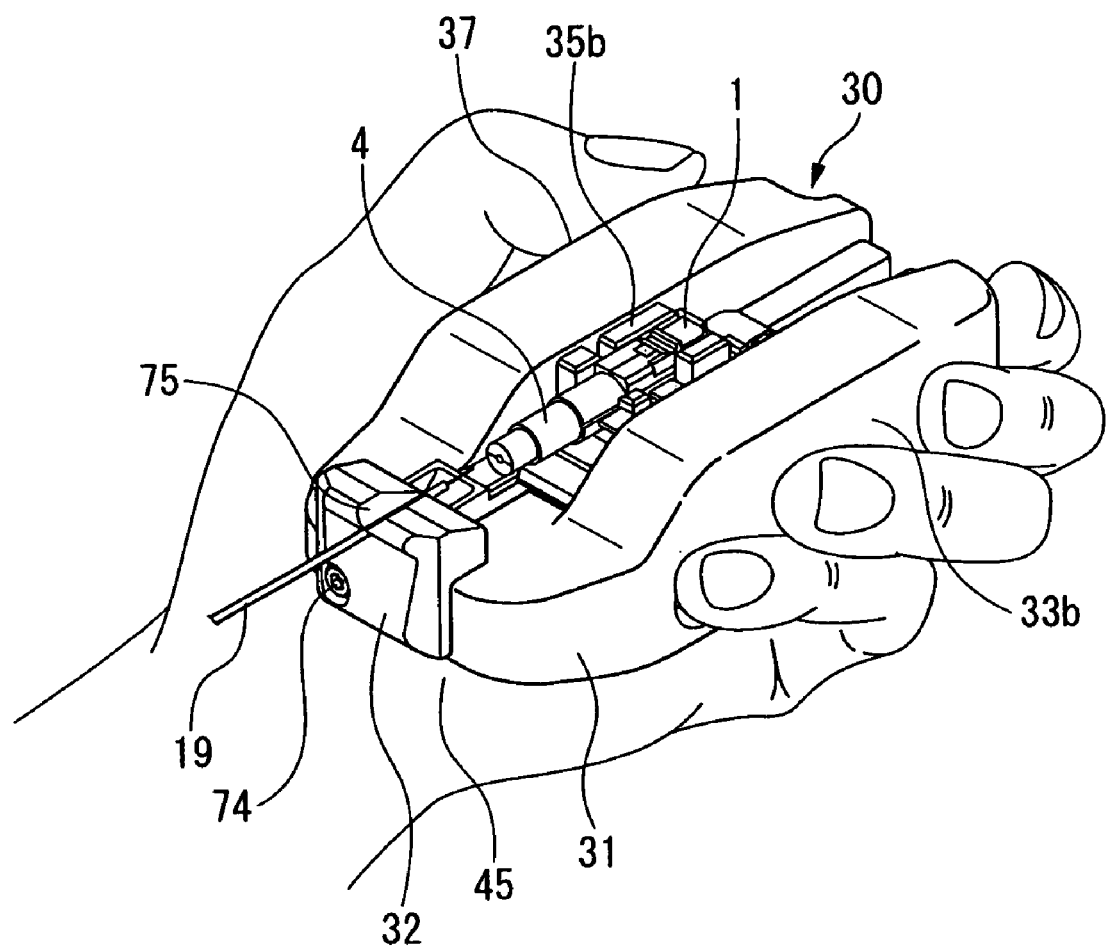
FIG. 4 is a perspective view showing a condition of use in which a mechanical splice-type connector is attached to the optical fiber connection jig shown in FIG. 1.

As shown in FIG. 4, outer surfaces 33b, 35b of the pair of grasp frames 33, 35 serve as grasp portions which are pressed by the fingers when the lower surfaces of these grasp frames are put on the palm 45. These grasp frames are formed by pressing a metal sheet or by injection molding a synthetic resin in such a manner that an outer shape, enabling the grasp frames to be easily grasped, is imparted thereto. In view of a lightweight design and others, it is preferred that these grasp frames be made of a synthetic resin.

Figure 5:
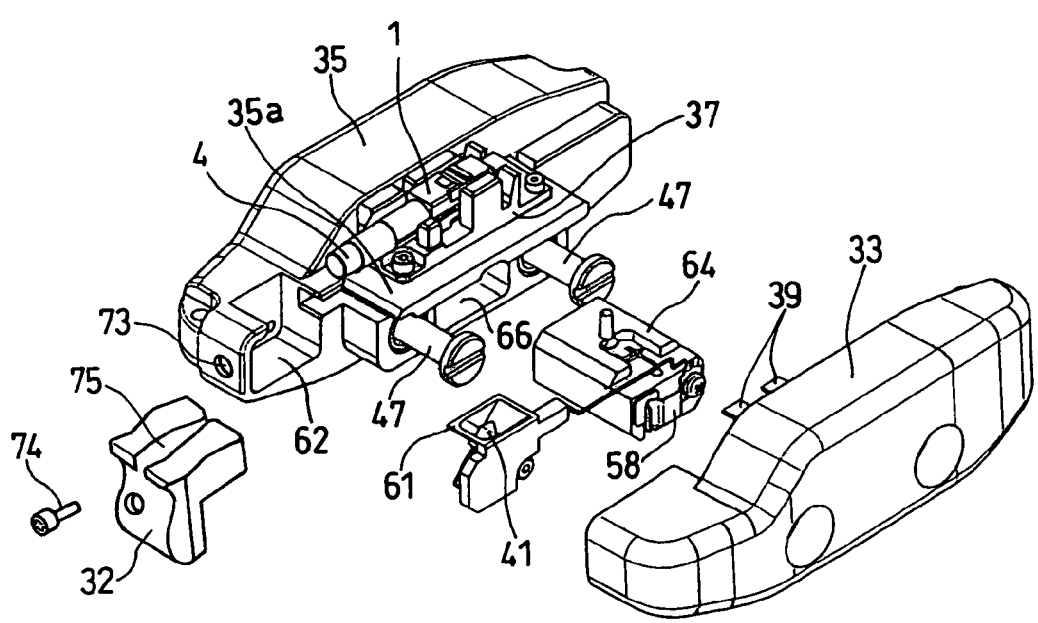
FIG. 5 is an exploded, perspective view of the optical fiber connection jig of FIG. 4 as seen obliquely from an upper right side.
Figure 12:
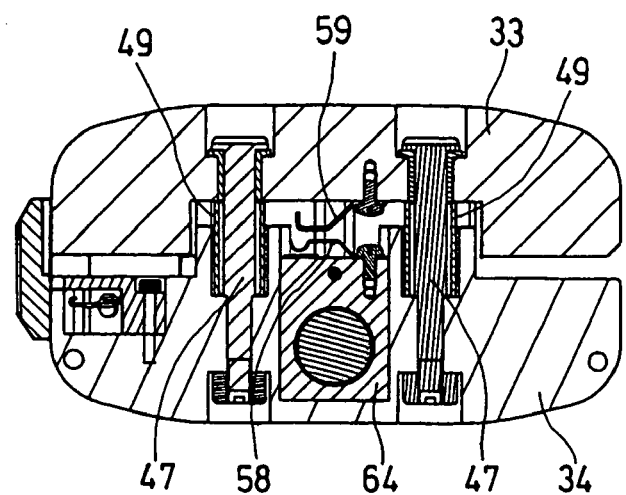
FIG. 12 is a cross-sectional view taken along the line A-A of FIG. 11.
Figure 16:
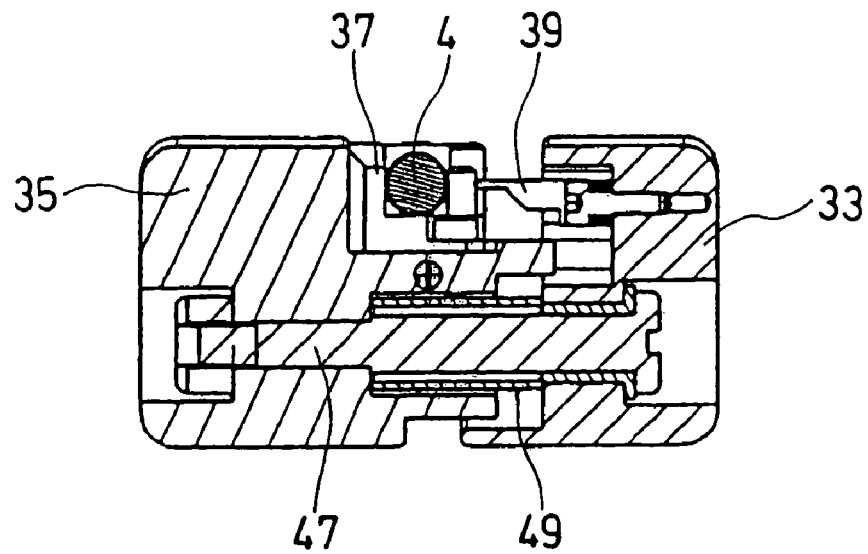
FIG. 16 is a view explanatory of a sliding movement of a pair of grasp frames, and (a) shows a condition before a grasping operation, and (b) shows a condition after the grasping operation, and both are a cross-sectional view taken along the line E-E of FIG. 11.
Figure 16:
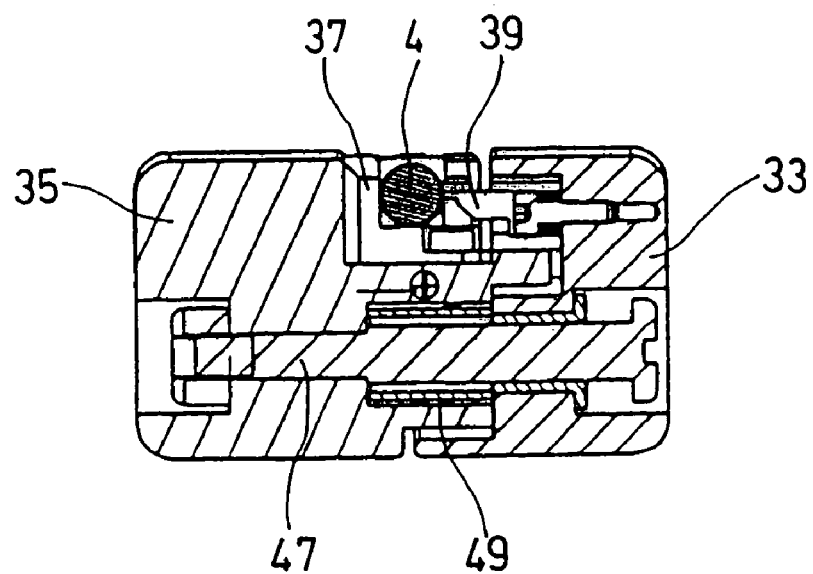

As shown in FIGS. 5, 12 and 16, the pair of left and right grasp frames 33, 35 are connected together by a pair of guide shafts 47, 47 (extending therethrough in a direction of opposing of the grasp frames 33, 35 to each other) so as to move toward and away from each other, and also the pair of grasp frames are urged away from each other by spring members 49 which are fitted in a compressed condition on the guide shafts 47, respectively.

A spring strength of the spring members 49 is so set that the wedge pieces 39, fitted respectively in the wedge insertion slits 4a, 4b by the grasping operation for the pair of grasp frames 33, 35, can be disengaged respectively from the wedge insertion slits 4a, 4b by the urging force of the spring members 49 when the grasping operation is canceled.

As shown in FIG. 5, the splice holder 37 is mounted on the inner surface of one grasp frame 35, and the wedge pieces 39, extending from the other grasp portion 33, can be received in the splice member 4 which is loaded in the splice holder 37, with the wedge insertion slits 4a, 4b exposed.

Figure 7:
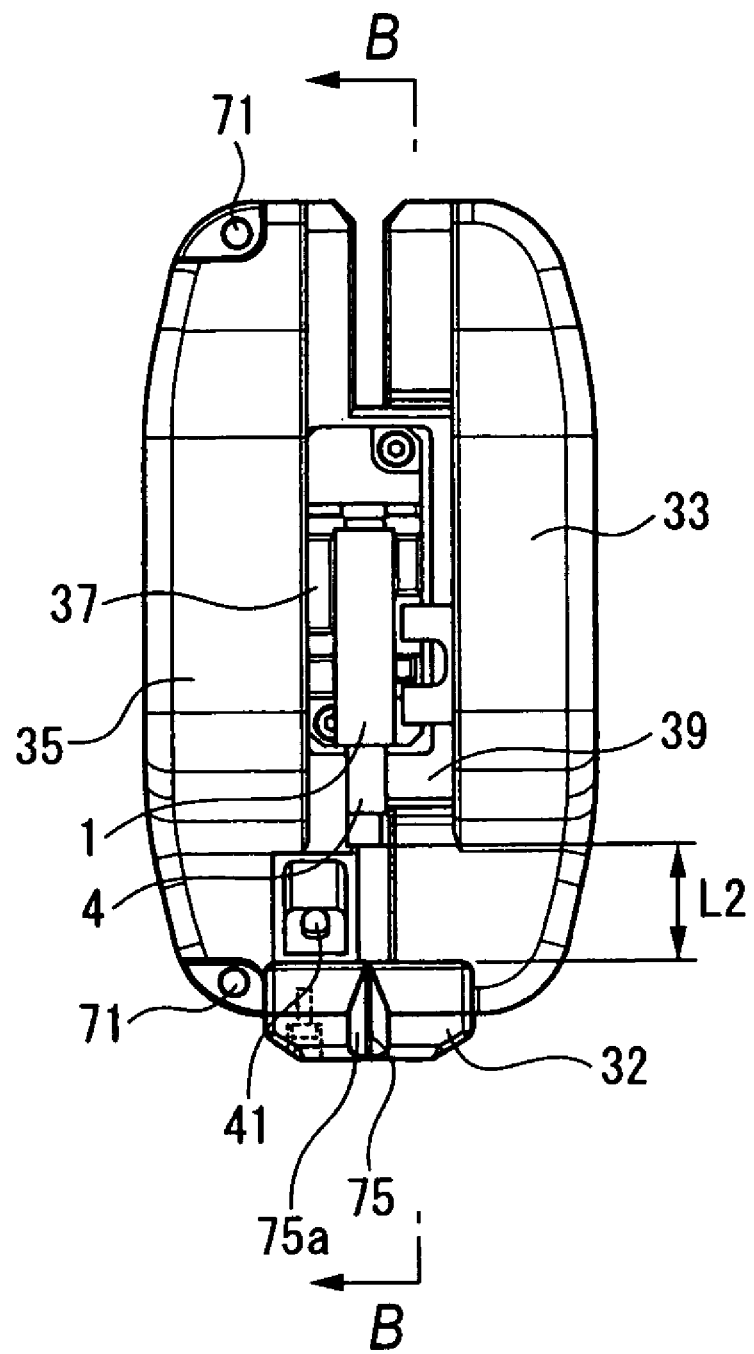
FIG. 7 is a plan view of the optical fiber connection jig shown in FIG. 4.
Figure 8:
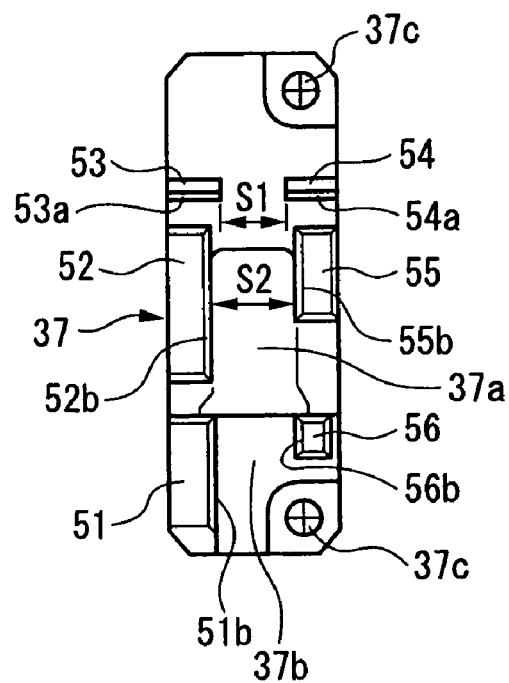
FIG. 8 is a plan view of a splice holder.

As shown in FIG. 8, this splice holder 37 has a plurality of position limitation step portions 51 to 56 formed on and projecting from a placing surface 37a on which the splice member 4 is to be placed, and these position limitation step portions abut against the outer surface of the splice member 4, thereby positioning the splice member 4 as shown in FIG. 7.

Figure 10:
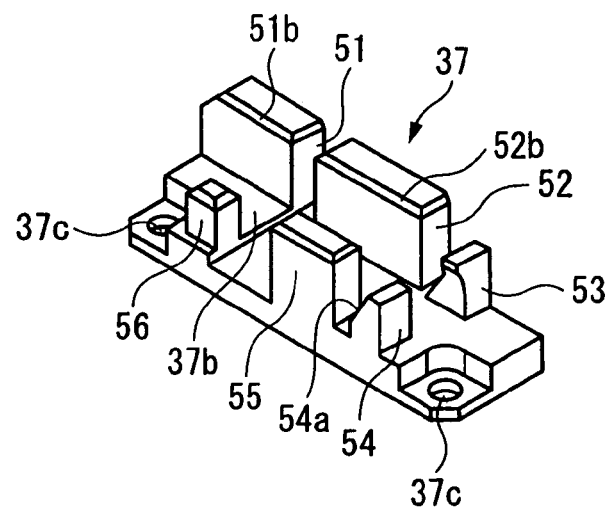
FIG. 10 is a perspective view of the splice holder.

As shown in FIG. 10, a bottom wall portion 37b which is slightly higher than the placing surface 37a is formed at a rear end portion of the placing surface 37a, and a rear end edge of a housing of the splice member 4 is held against a step portion formed between this bottom wall portion 37b and the placing surface, thereby limiting the movement of the splice member 4 in the rearward direction.

The splice holder 37 is screw-fastened to a bottom wall portion 35a of the grasp frame 35 through mounting holes 37c formed respectively through portions of the placing surface 37a and bottom wall portion 37b.

Figure 9:
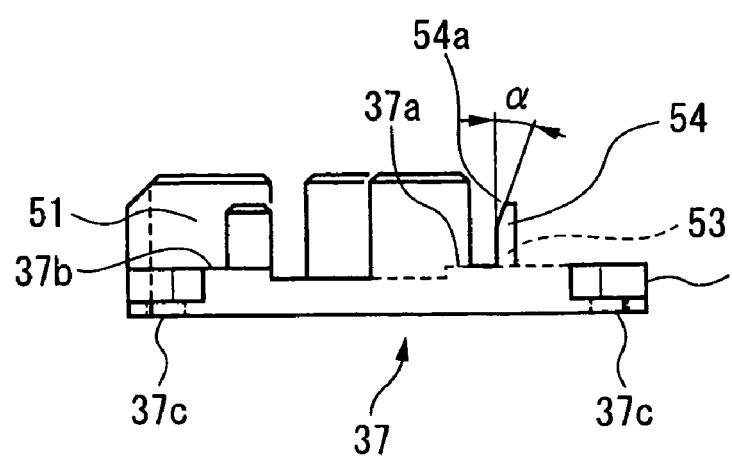
FIG. 9 is a right side-elevational view of the splice holder.

Among the position limitation step portions 51 to 56, the position limitation step portions 53, 54 for positioning the distal end portion of the splice member 4 have respective tapering surfaces 53a, 54a of an angle α for guiding the splice member 4 (which is inserted between the position limitation step portions 51 to 56) into the predetermined position as shown in FIGS. 8, 9 and 10. Preferably, the inclination angle α of these tapering surfaces 53a, 54a is set to around 20°.

Also, chamfered portions 51b, 52b, 55b, 56 for guiding the splice member 4 between the position limitation step portions 51 to 56 are formed respectively at inner edge portions of the position limitation step portions 51 to 56 at the upper surfaces thereof.

Further, in the splice holder 37 of this embodiment, a spacing distance S1 between the position limitation step portions 53, 54 for positioning the distal end portion of the splice member 4 is set to a value smaller than a spacing distance S2 between the position limitation step portions 52, 55 for positioning an intermediate portion of the splice member 4. Also, the spacing distance S1 between the position limitation step portions 53, 54 is set to the value smaller than a width W1 (see FIG. 1) of the distal end portion of the splice member 4. By setting the dimensions in this manner, the position limitation step portions 53, 54 can position the splice member 4 in such a manner that the splice member 4 can not move in a direction toward which the front end thereof is directed, although these position limitation step portions 53, 54 will not block the ferrule 3 exposed at the front end of the splice member 4.

Figure 6:
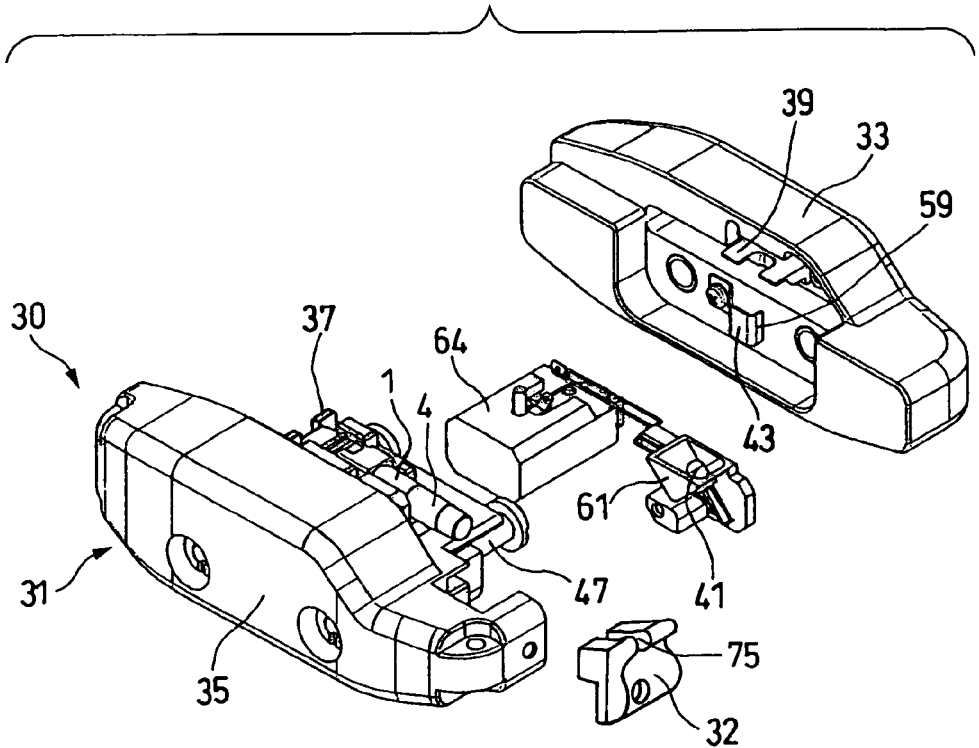
FIG. 6 is an exploded, perspective view of the optical fiber connection jig of FIG. 4 as seen obliquely from an upper left side.

In this embodiment, the illumination means 4 uses an LED as a lighting tube. As shown in FIGS. 5, 6 and 12, the illumination lighting switch 43 has a structure employing leaf springs 58, 59 whose contact portions are electrically connected together when the spacing distance between the pair of grasp frames 33, 35, approaching each other, becomes smaller than a predetermined length.

As shown in FIG. 5, a lamp holder 61, holding the illumination means 41, is received and held in a lamp receiving portion 62 formed in the rear end portions of the pair of grasp frames 33, 35. An optical axis of the LED, received in this portion, is directed toward the rear end portion of the splice member 4 fixed to the splice holder 37, and the LED illuminates the region around the optical fiber holding groove 8 at the rear end of the splice member 4.

The illumination lighting switch 43 turns on and off a power supply circuit between a cell holder 64 (containing an electric cell) and the illumination means 41. The cell holder 64 is received and held in a power receiving portion 66 formed in the bottom wall portions of the pair of grasp frames 33, 35.

Figure 14:
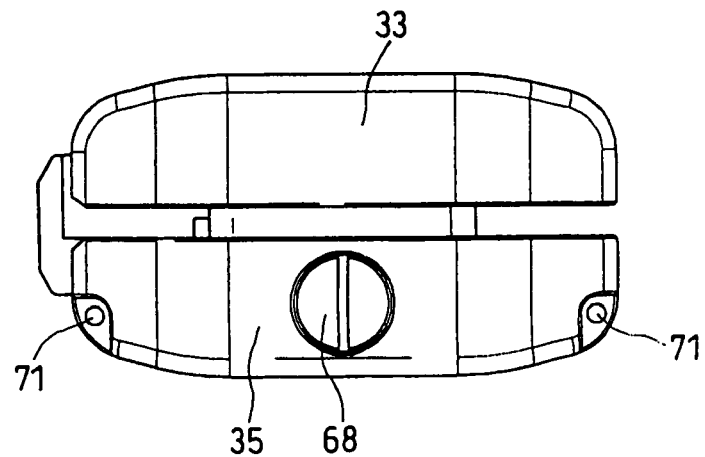
FIG. 14 is a view as seen in a direction of arrow C of FIG. 11.

As shown in FIG. 14, a cell exchanging-purpose screw lid 68 for enabling the bottom of the cell holder 64 to be exposed for exchanging the cell is provided at the bottom surface of the grasp frame 35 having the power receiving portion 66.

Figure 11:
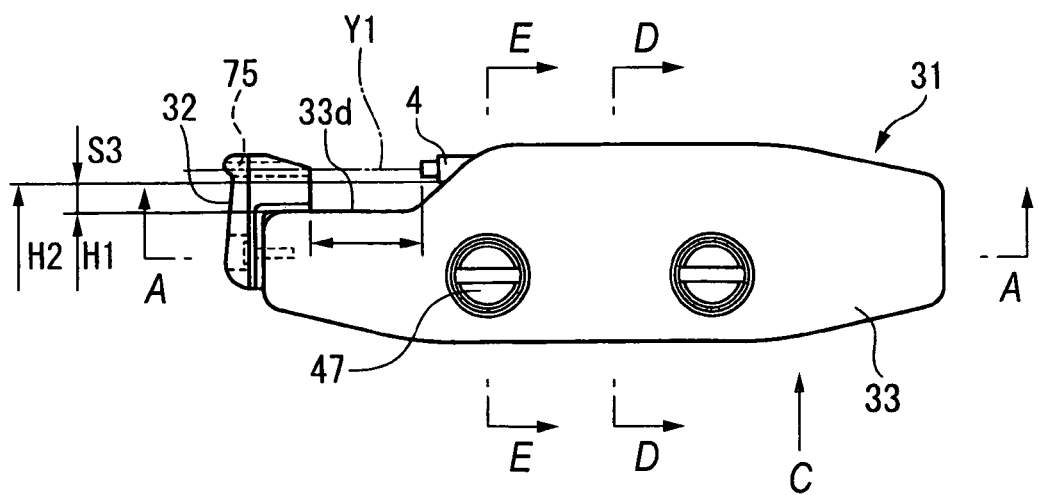
FIG. 11 is a right side-elevational view of the optical fiber connection jig shown in FIG. 4.
Figure 13:
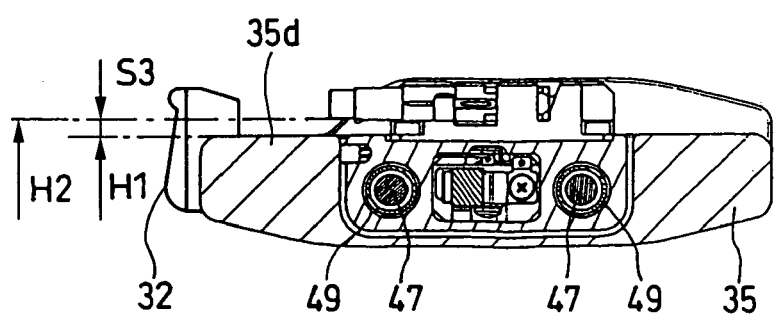
FIG. 13 is a cross-sectional view taken along the line B-B of FIG. 7.

In this embodiment, in order that the open end of the optical fiber holding groove 8 can be disposed at a level above the surface of the jig body 31, a height H1 of surfaces 33d, 35d of the grasp frames 33, 35, extending from the vicinity of the open end of the optical fiber holding groove 8 toward the optical fiber 20, is lower than a height H2 of the surface supporting the splice member 4 as shown in FIGS. 11 and 13.

Therefore, a gap S3 is secured between the surfaces 33d, 35d of the pair of grasp frames 33, 35 and the lower surface of the rear end portion of the splice member 4.

In this embodiment, further, strap holes 71 are provided in one grasp frame 35.

Figure 15:
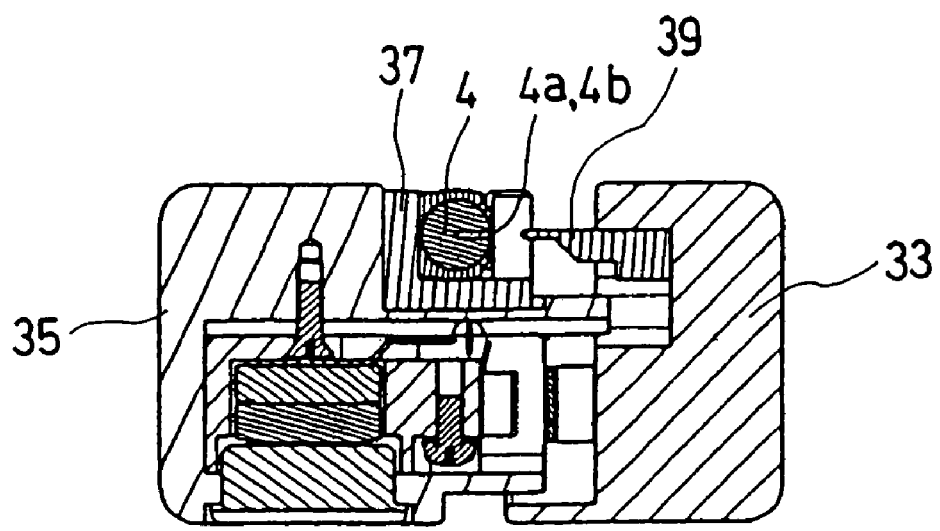
FIG. 15 is a view explanatory of an operation of a wedge piece, and (a) shows a condition before the fitting of the wedge piece, and (b) shows a condition after the fitting of the wedge piece, and both are a cross-sectional view taken along the line D-D of FIG. 11.
Figure 15:
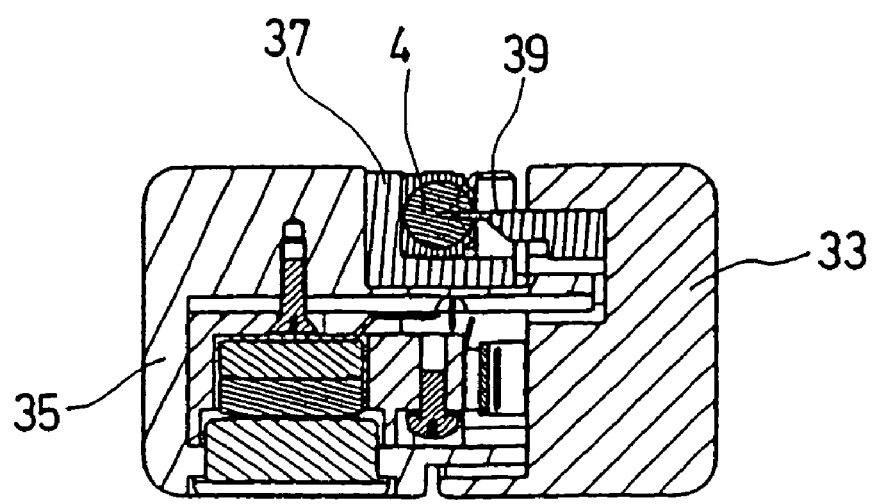

In the jig body 31 described above, when the pair of grasp frames 33, 35 are not moved toward each other by the grasping operation, the wedge pieces 39 are spaced part from the splice member 4 on the splice holder 37 as shown in FIG. 15(a), and also the spring members 49, fitted respectively on the guide shafts 47, are disposed in a preloaded compressed condition obtained at the time of assembling, as shown in FIG. 16(a).

When the pair of grasp frames 33, 35 are grasped to be moved toward each other, the wedge pieces 39 are fitted respectively into the wedge insertion slits 4a, 4b in the splice member 4 on the splice holder 37 as shown in FIG. 15(b), and also the spring members 49, fitted respectively on the guide shafts 47, are further compressed from the preloaded compressed condition obtained at the time of assembling, as shown in FIG. 16(b).

As shown in FIGS. 15(b) and 16(b), when the pair of grasp frames 33, 35 are grasped to be moved toward each other, the wedge pieces 39 are fitted respectively into the wedge insertion slits 4a, 4b in the splice member 4, thereby expanding the optical fiber holding groove 8 in the splice member 4, and therefore the optical fiber 20 can be inserted into the optical fiber holding groove 8.

When the grasping operation for the grasp frames 33, 35 is canceled after the insertion of the optical fiber 20, the grasp frames 33, 35 are returned by restoring forces of the spring members 49, and are spaced the original spacing distance from each other, so that the wedge pieces 39 are withdrawn respectively from the wedge insertion slits 4a, 4b, and the optical fiber 20 is held between the base member 5 and the cover member 6 which form the splice member 4.

Incidentally, a refractive index-matching material or the like can be provided by coating/filling between butting surfaces of an optical fiber 2 (see FIG. 33) (in the ferrule 3) and the optical fiber 20 (made bare at the coated optical fiber 19) which are connected together, and by doing so, connection characteristics can be enhanced. By suitably coating an adhesive onto the optical fiber holding groove 8, the strength of fixing of the optical fibers 2 and 20 to each other can be increased.

The fiber insertion guide 32 is detachably mounted on the grasp frame 35 by a screw (screw with a hexagonal hole) 74 threaded into a screw hole 73 formed in the front surface of the grasp frame 35.

This fiber insertion guide 32 has a coated fiber guide groove 75, and when the fiber insertion guide 32 is mounted on the grasp frame 35, this coated fiber guide groove 75 extends in the direction of a center axis Y1 (see FIG. 1) of the optical fiber holding groove 8 in the splice member 4 held in the splice holder 37. The coated optical fiber 19 to be connected to the splice member 4 is guided generally onto the center axis Y1 of the optical fiber holding groove 8 by this coated fiber guide groove 75.

In this embodiment, the coated fiber guide groove 75 is an upwardly-open groove into which the coated optical fiber 19 can be fitted from the upper side, and side surfaces of an upper portion of the groove are tapering as at 75a so that the coated optical fiber 19 can be easily fitted into the groove. A width dimension b1 (see FIG. 2) of a lower portion of the groove is set to a value corresponding to the fiber diameter of the coated optical fiber 19 to be connected, and is so precisely set that the coated optical fiber 19 will not shake.

In this embodiment, the fiber insertion guide 32 has the coated fiber guide groove 75 which is spaced a predetermined distance L2 from the open end of the optical fiber holding groove 8 of the splice member 4 (held in the splice holder 37) in the direction of the center axis Y1 of the optical fiber holding groove 8 as shown in FIG. 7. The coated optical fiber 19, set on this coated fiber guide groove 75, is slid thereon toward the splice member 4, so that the optical fiber 20, made bare at the distal end portion of the coated optical fiber 19, is inserted and guided into the optical fiber holding groove 8.

Specifically, it is preferred that the predetermined distance L2 from the open end of the optical fiber holding groove 8 to the coated fiber guide groove 75 be not smaller than the length of insertion of the bare optical fiber 20 (at the distal end portion of the optical fiber 19) into the optical fiber holding groove 8. This arrangement is adopted in order to guide only the sheath portion of the coated optical fiber 19 so that when the coated optical fiber 19 is slid on the coated fiber guide groove 75, the optical fiber 20 will not be damaged by this sliding movement.

In this embodiment, the fiber insertion guide 32 is made of a transparent material such for example as a transparent resin.

In the optical fiber connection jig 30 of the first embodiment described above, the pair of opposed grasp frames 33, 35 for holding the mechanical splice-type connector 1 therebetween can be reduced in outer size to such a degree that these grasp frames can be received in the palm, and therefore the small-size and lightweight design and excellent portability can be obtained.

In addition, the movement of the pair of grasp members 33, 35 relative to each other in the opposing direction also achieves the advancing and retracting movement of the wedge pieces 39 relative to the wedge insertion slits 4a, 4b in the splice member 4, and a special-purpose drive mechanism for advancing and retracting the wedge pieces 39, a special-purpose lever for advancing and retracting the wedge pieces 39, or other means does not need to be provided, and therefore the construction and the operation are simplified, so that the production can be carried out at a low cost.

And besides, the jig itself can be received in the palm, and the connection of the second optical fiber 20 can be easily carried out with the one-hand grasping operation at the field or the like, and therefore the operation for connecting the second optical fiber 20 to the mechanical splice-type connector 1 at the field can be effected easily.

The more important point is that the fiber insertion guide 32, provided at the jig body 31, locates the coated optical fiber 19 on the center axis Y1 of the optical fiber holding groove 8 by the coated fiber guide groove 75, and therefore when the optical fiber 20 is to be inserted into the optical fiber holding groove 8, the center axis of the optical fiber 20 can be automatically positioned on the center axis Y1 of the optical fiber holding groove 8. Therefore, when inserting the optical fiber 20 into the optical fiber holding groove 8 in the splice member 4, the optical fiber 20 can be easily and positively inserted into the optical fiber holding groove 8 without imposing any burden of alignment or others on the operator, and the optical fiber-connecting operation through the splice member 4 at the optical fiber installation field can be effected easily.

Therefore, the handleablity at the field is enhanced, and the low production cost can be achieved, so that an increased demand for the mechanical splice-type connector 1 itself can be expected.

Furthermore, in the optical fiber connection jig 30 of this embodiment, the coated fiber guide groove 75 in the fiber insertion guide 32 is spaced the spacing distance L2 (which is not smaller than the length of insertion of the optical fiber 20) from the open end of the optical fiber holding groove 8 in the splice member 4 held in the splice holder 37.

Therefore, in the operation for inserting the optical fiber 20, only the sheath portion of the coated optical fiber 19 is slid on the coated fiber guide groove 75, so that the optical fiber 20 is prevented from being damaged by this sliding movement.

Furthermore, in the optical fiber connection jig 30 of this embodiment, the fiber insertion guide 32 is detachably provided on the jig body 31, and therefore for example, when the fiber diameter of the coated optical fiber for connection to the splice member 4 is changed, the fiber insertion guide is exchanged with one having a coated fiber guide groove corresponding to a replacement fiber diameter, and merely by doing so, a similar alignment performance to the previous performance can be secured, and thus the change of the diameter of the fiber to be connected can be inexpensively met, and besides the optical fiber connection jig itself can have a general-purpose ability for meeting many kinds of fiber diameters.

Furthermore, in the optical fiber connection jig 30 of this embodiment, the fiber insertion guide 32 is made of the transparent material, and therefore during the operation for connecting the coated optical fiber to the splice member 4, the displacement of the bare portion of the optical fiber 20 can be easily viewed from the exterior through the transparent fiber insertion guide 32, and the operation for inserting and connecting the optical fiber 2 relative to the splice member 4 can be effected more easily.

In the above embodiment, although the fiber insertion guide 32 is made of the transparent material, it is not always necessary to use such transparent material, but a translucent material can be used, in which case also a similar advantage can be obtained, and the operation for inserting and connecting the optical fiber 2 relative to the splice member 4 can be carried out easily.

Furthermore, in this embodiment, the mechanism for moving the pair of grasp frames 33, 35 relative to each other (which mechanism also achieves the advancing and retracting movement of the wedge pieces 39 relative to the wedge insertion slits 4a, 4b in the splice member 4) is achieved by the simple connecting mechanism provided by the combination of the pair of guide shafts 47, 47 and the spring members 47, and therefore this is effective in reducing the component parts of the jig and also in achieving the simplified and compact structure.

Furthermore, the optical fiber connection jig 30 of this embodiment is provided with the illumination means 41 used when effecting the operation for connecting the second optical fiber 20 at the field or the like, and therefore there will not be encountered a situation in which the optical fiber holding groove 8 can not be clearly viewed in the dark, and therefore the optical fiber holding groove 8 can be easily viewed, so that the connecting operation can be carried out easily.

Furthermore, the illumination means 41 is of such a construction that it is automatically lighted during the grasping operation for the grasp frames 33, 35, and when the grasping operation for the grasping frames 33, 35 is canceled, this illumination means is automatically turned off. Therefore, a lighting time of the illumination means 41 is reduced to a necessary minimum period, thus eliminating a waste of the lighting, and by doing so, unnecessary power consumption of the electric cell or the like used in the illumination means can be prevented, and also a small-size design of the electric cell or the like can be achieved.

Furthermore, the leaf springs 58, 59 which can be easily produced are used as the illumination light switch 43, and therefore a low-cost design can be achieved by relatively simplifying the construction of the switch itself, and besides the urging forces of the leaf springs 58 and 59, forming the illumination lighting switch 43, can be efficiently used as the urging forces for withdrawing the wedge pieces 39 from the respective wedge insertion slits 4a, 4b or for other purposes, and accordingly the spring members 49 (for urging the pair of grasp frames 33, 35 away from each other) or others can be formed into a smaller-size.

Furthermore, the surfaces of the rear end portions of the pair of grasp frames 33, 35 are disposed at a level lower than the rear end portion of the splice member 4 (relative to which the optical fiber 20 is inserted and connected), so that the rear end portion of the splice member 4 is disposed at a level above these surfaces. Therefore, when the optical fiber 20 is to be inserted into the optical fiber holding groove 8, the rear end of the splice member 4 can be easily viewed, and besides when the splice member 4 is to be grasped so as to be attached to and detached from the splice holder 37, this operation can be easily carried out.

Furthermore, the strap holes 71 are formed in the grasp frame 35, and therefore when the jig is tied to the body by a strap or the like connected to the strap holes 71, inconveniences, such as the dropping of the jig during the operation and the loss of the jig, can be prevented, so that the portability and the handleability can be further enhanced.

Furthermore, the position limitation step portions 51 to 56 for abutting the outer surface of the splice member 4 so as to position the same on and project from the splice holder 37 for positioning and fixing the splice member 4, and besides the tapering surfaces 53a, 54a and the chamfered portions 51b, 52b, 55b, 56b for guiding the insertion of the splice member 4 are formed at these position limitation step portions 51 to 56. Therefore, with the simple operation in which the splice member 4 is pressed toward the position limitation step portions 51 to 56 for the splice member 4, the accurate positioning of the splice member 4 can be achieved, and this serves to enhance the efficiency of the operation for connecting the optical fiber 20.

Figure 17:
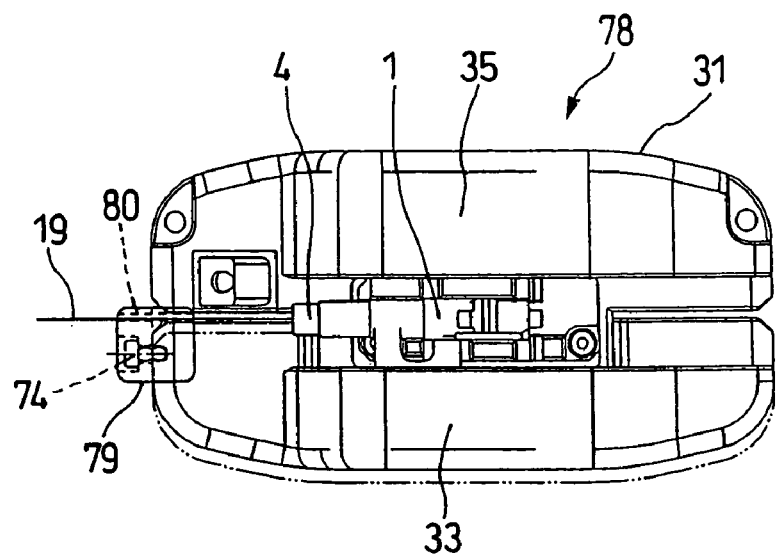
FIG. 17 is a plan view of a second embodiment of an optical fiber connection jig of the present invention.
Figure 18:
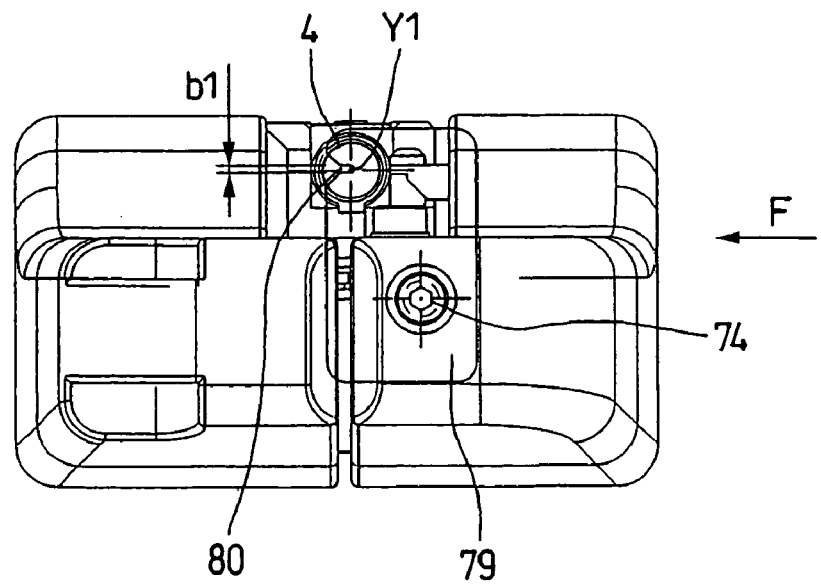
FIG. 18 a front-elevational view of the optical fiber connection jig shown in FIG. 17
Figure 19:
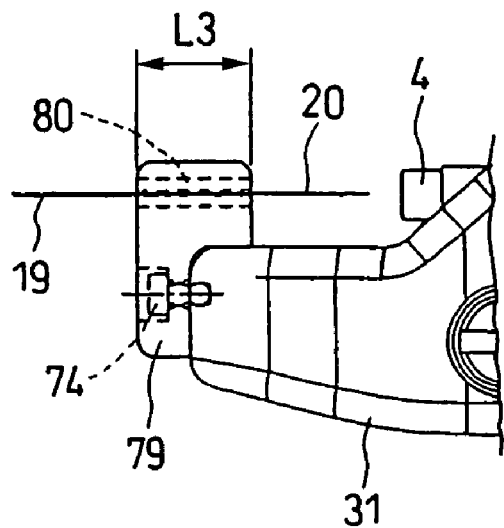
FIG. 19 is a view as seen in a direction of arrow F of FIG. 18.
Figure 20:
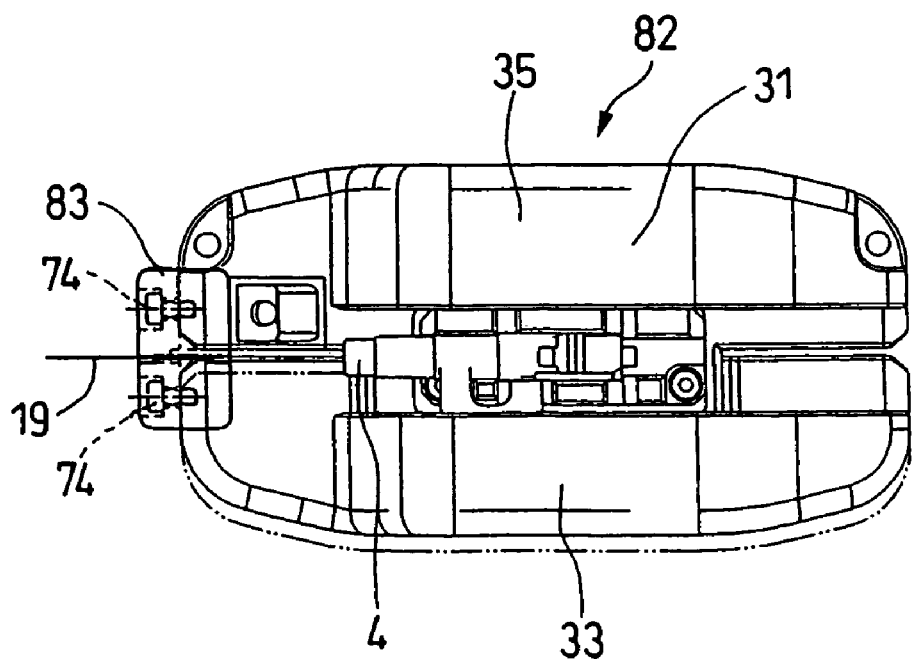
FIG. 20 is a plan view of a third embodiment of an optical fiber connection jig of the present invention.

FIGS. 17 to 19 show a second embodiment of an optical fiber connection jig of the present invention.

In the optical fiber connection jig 78 of this embodiment, a fiber insertion guide 79 is detachably provided at a front surface of a jig body 31.

The jig body 31 is the same as that of the first embodiment described above.

The fiber insertion guide 79 is similar to that of the first embodiment in that this fiber insertion guide 79 has a coated fiber guide groove 80 extending along the center axis Y1 of the optical fiber holding groove 8 in the splice member 4 held in the jig body 31, that the coated optical fiber 19 is guided generally onto the center axis of the optical fiber holding groove 8 in the splice member 4 by this coated fiber guide groove 80 and in that this fiber insertion guide is detachably mounted on the jig body 31 by a screw 74.

In the fiber insertion guide 79 of this embodiment, however, the coated fiber guide groove 80 is a laterally-open groove as shown also in FIG. 18.

A width b1 of a bottom portion of the coated fiber guide groove 80 is set in the same manner as in the first embodiment. Preferably, a length L3 of the coated fiber guide groove 80 in the direction of the center axis of the splice member 4 is made as large as possible so as to make the sliding movement of the coated optical fiber 19 stable, while securing a spacing distance from the open end of the optical fiber holding groove 8 of the splice member 4 so that only the sheath portion of the coated optical fiber 19 can contact this coated fiber guide groove while the optical fiber 20 will not contact this coated fiber guide groove.

Thus, the coated fiber guide groove, formed in the fiber insertion guide of the present invention, may be either in the upwardly-open form or in the laterally-open form.

FIGS. 20 to 24 show a third embodiment of an optical fiber connection jig of the present invention.

In the optical fiber connection jig 82 of this embodiment, a fiber insertion guide 83 is detachably provided at a front surface of a jig body 31.

This fiber insertion guide 83 is similar to that of the second embodiment in that this fiber insertion guide 83 has a coated fiber guide groove 84 of the laterally-open type extending along the center axis Y1 of the optical fiber holding groove 8 in the splice member 4 held in the jig body 31, that the coated optical fiber 19 is guided generally onto the center axis of the optical fiber holding groove 8 in the splice member 4 by this coated fiber guide groove 84 and that the fiber insertion guide is detachably mounted on the jig body 31 by screws 74.

Figure 23:
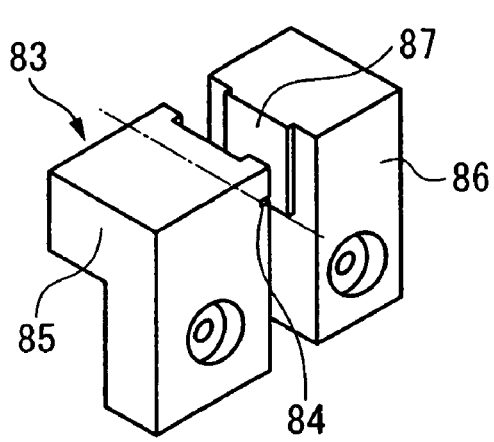
FIG. 23 is a perspective view of a fiber insertion guide with a lid portion as seen obliquely from an upper side at a front side, and (a) is a perspective view as seen from the upper side while showing a left side, and (b) is a perspective view as seen from the upper side while showing a right side.
Figure 23:
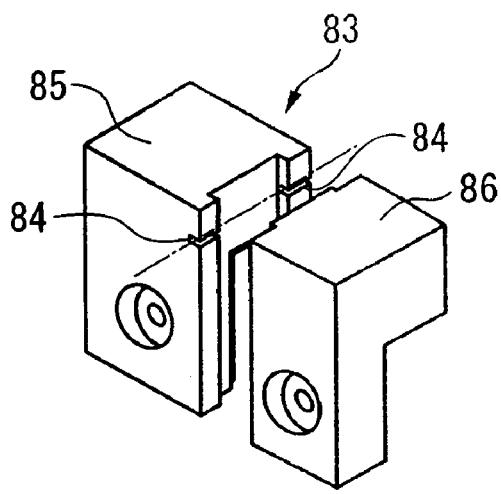
Figure 24:
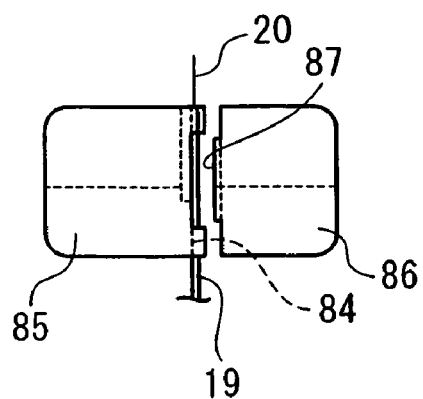
FIG. 24 is a view explanatory of an operation of the fiber insertion guide of FIG. 23 as seen from the top, and (a) is a plan view showing an opened condition of the lid portion, and (b) is a plan view showing a closed condition of the lid portion.
Figure 24:
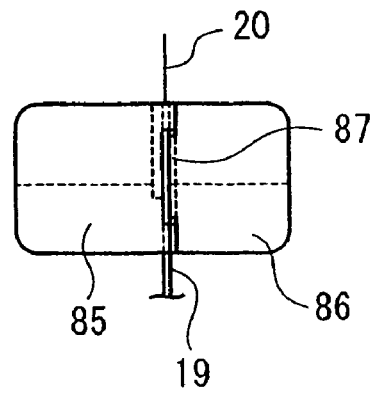

However, the fiber insertion guide 83 of this embodiment is divided into a pair of left and right guide blocks 85, 86 which are disposed in opposed relation to each other, with the coated optical fiber held therebetween as shown in FIG. 23.

The guide block 85 has the coated fiber guide groove 84 of the left side-open type, and is detachably fixed to a grasp frame 35 by the screw 74.

The guide block 86 has a lid portion 87 for preventing the coated optical fiber 19 from being disengaged from the coated fiber guide groove 84 during the time when the coated optical fiber 19 is inserted into the optical fiber holding groove 8, and this guide block is detachably fixed to a grasp frame 33 by the screw 74.

In an initial condition in which the pair of grasp frames 33, 35 are not grasped, the guide block 86 is disposed to be spaced apart from the guide block 85. In the condition in which the guide block 86 is spaced apart from the guide block 85, the coated optical fiber 19 is passed through the coated fiber guide groove 84 in the guide block 85 as shown in FIG. 24(a), and then when the pair of grasp frames 33, 35 are grasped to be moved toward each other as shown in FIG. 24(b), the movement of the coated optical fiber 19 (passing through the coated fiber guide groove 84) toward the guide block 86 is prevented by the lid portion 87, so that the coated optical fiber is prevented from being disengaged from the coated fiber guide groove 84.

With this construction in which there is provided the lid portion 87 for preventing the disengagement of the coated optical fiber 19 from the coated fiber guide groove 84, there can be positively avoided inconveniences such as a situation in which the coated optical fiber 19 is disengaged from the coated fiber guide groove 84 during the connecting operation, so that the distal end of the optical fiber strikes against the edge of the opening of the optical fiber holding groove 8, and therefore the reliability of the jig can be enhanced.

Figure 21:
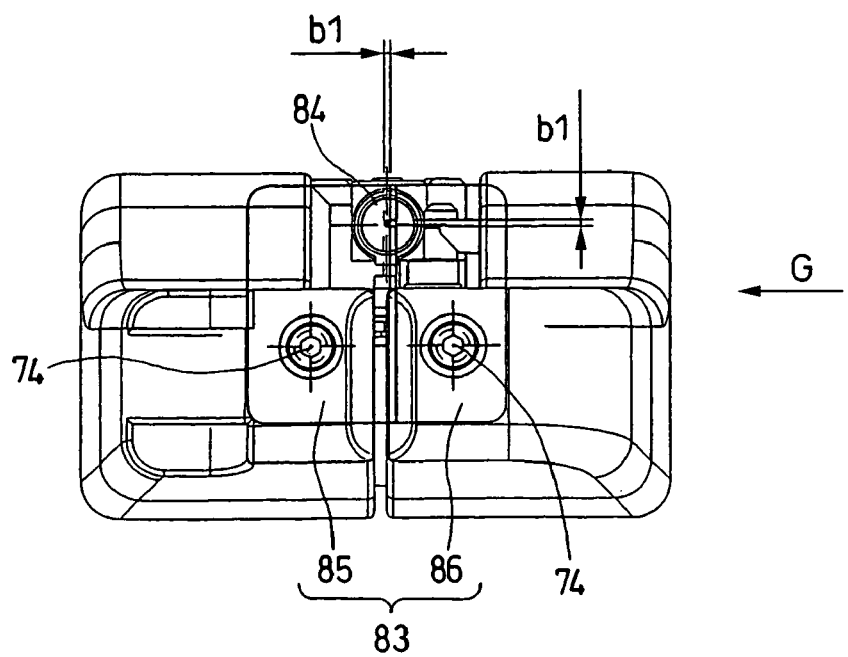
FIG. 21 is a front-elevational view of the optical fiber connection jig shown in FIG. 20.
Figure 22:
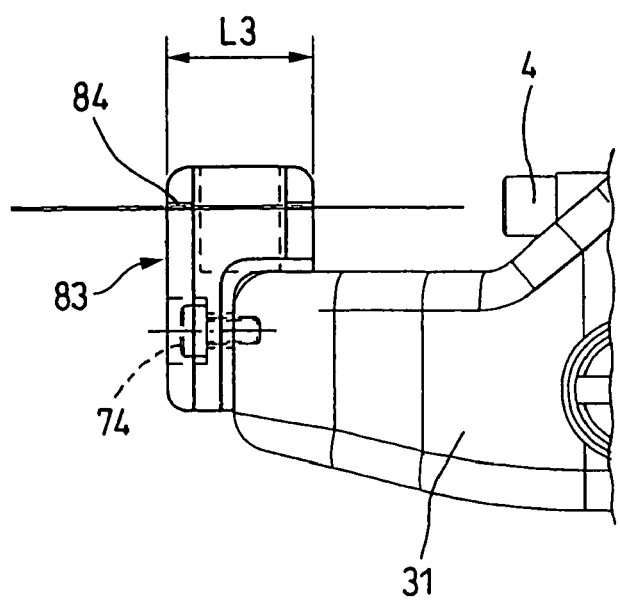
FIG. 22 is a view as seen in a direction of arrow G of FIG. 21.

In the case of this embodiment, when the coated fiber guide groove 84 is closed by the lid portion 87, a dimension of a gap of the coated fiber guide groove 84 in its opening direction becomes equal to a groove width b1 as shown in FIG. 21, so that the coated optical fiber 19 can be prevented from shaking both in the upward-downward direction and the lateral direction.

Figure 25:
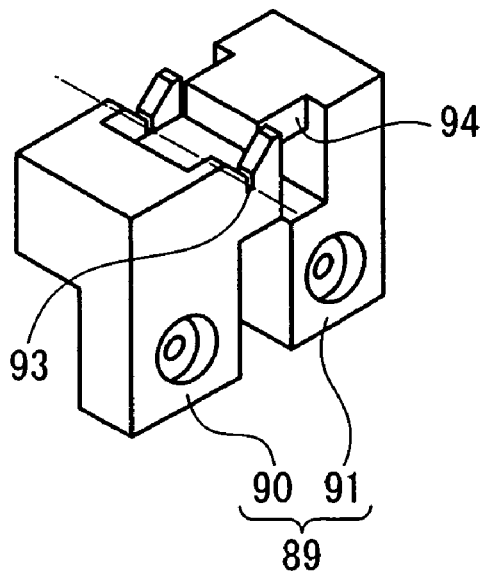
FIG. 25 is a perspective view of a fiber insertion guide with a lid portion (used in a fourth embodiment of an optical fiber connection jig of the present invention) as seen obliquely from an upper side at a front side, and (a) is a perspective view as seen from the upper side while showing a left side, and (b) is a perspective view as seen from the upper side while showing a right side.
Figure 25:
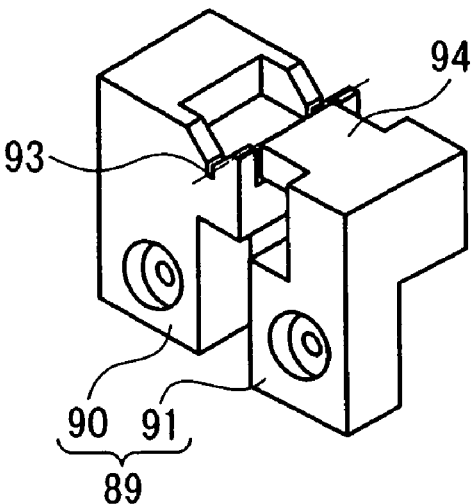
Figure 26:
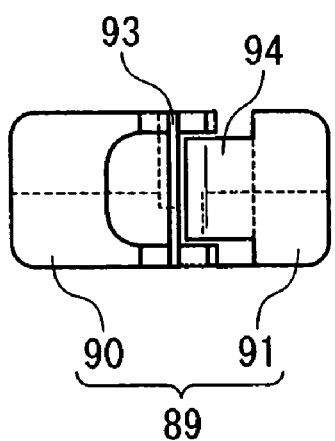
FIG. 26 is a view explanatory of an operation of the fiber insertion guide of FIG. 25 as seen from the top, and (a) is a plan view showing an opened condition of the lid portion, and (b) is a plan view showing a closed condition of the lid portion.
Figure 26:
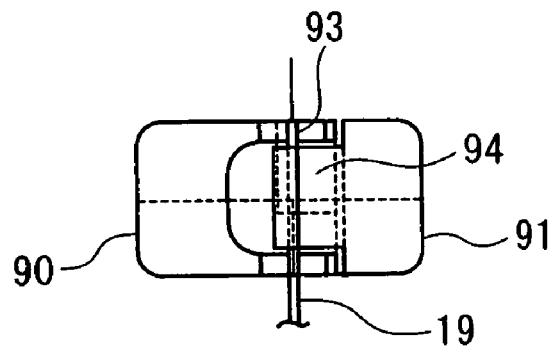
Figure 27:
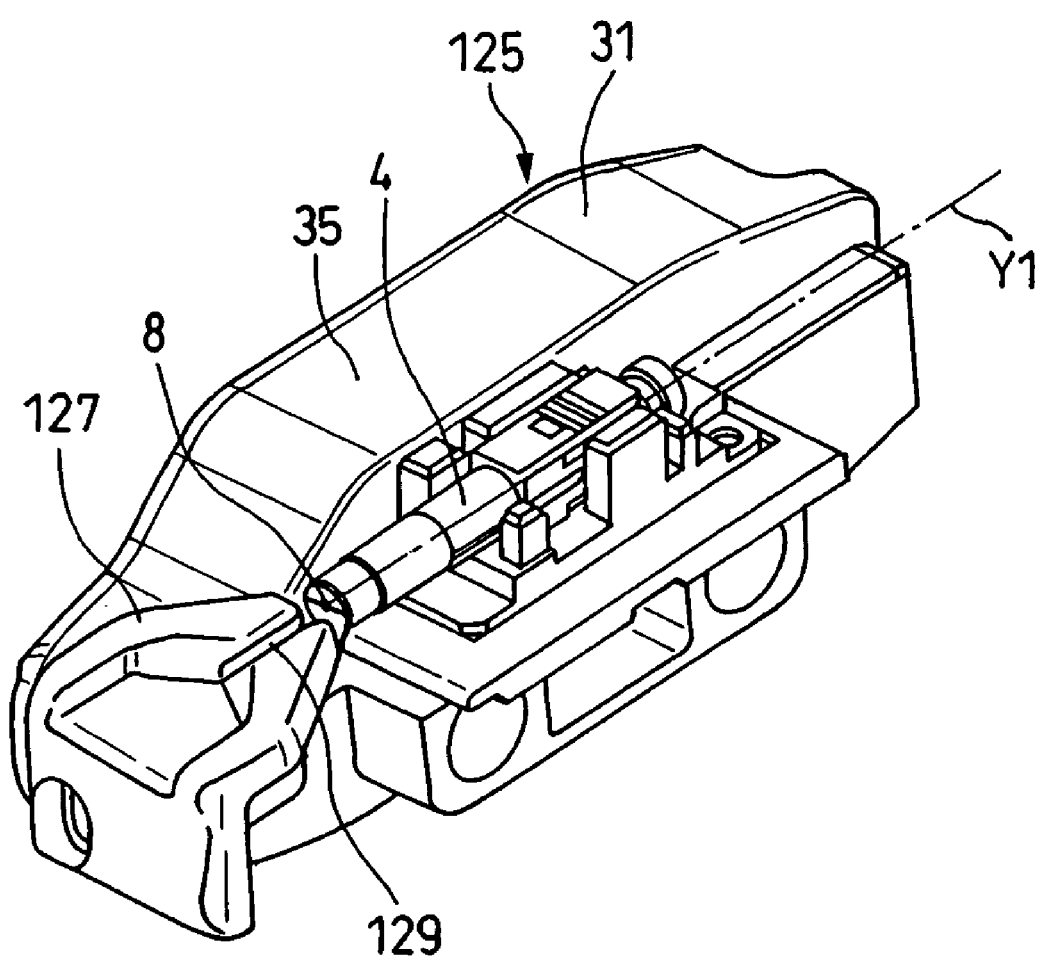
FIG. 27 is a perspective view of a fifth embodiment of an optical fiber connection jig of the present invention, with part thereof omitted.
Figure 28:
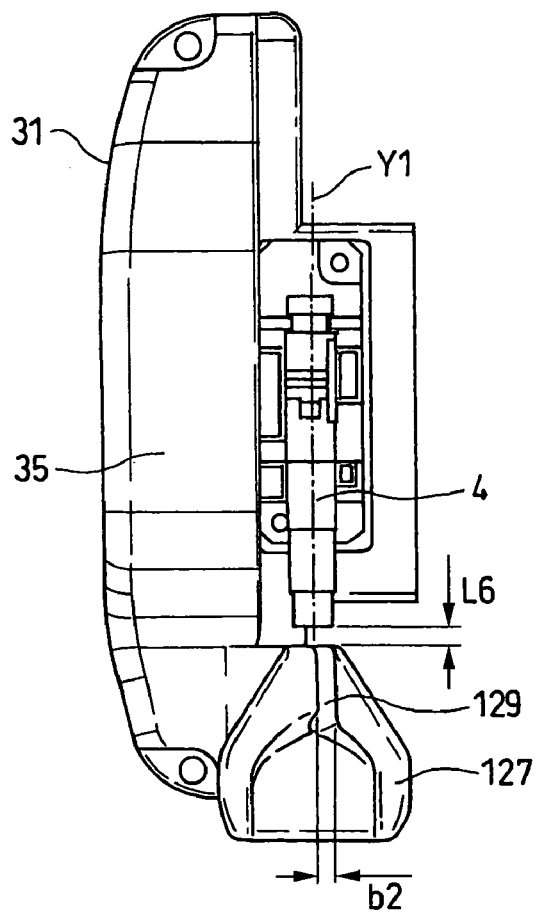
FIG. 28 is a plan view of the optical fiber jig shown in FIG. 27.
Figure 29:
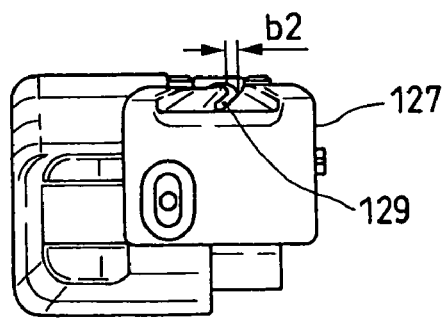
FIG. 29 is a front-elevational view of the optical fiber jig shown in FIG. 27.
Figure 30:
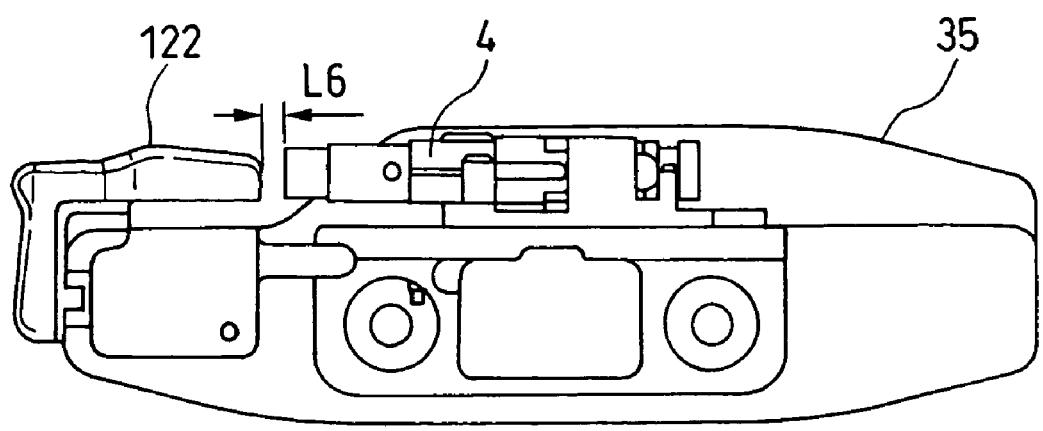
FIG. 30 is a side-elevational view of the optical fiber jig shown in FIG. 27.

FIGS. 25 and 26 show a further embodiment of a fiber insertion guide of the present invention.

This fiber insertion guide 89 is similar to the fiber insertion guide 83 of the third embodiment in that this fiber insertion guide 89 comprises a pair of left and right guide blocks 90, 91 separately screw-fastened to a jig body 31, that the left guide block 90 has a coated fiber guide groove 93 for guiding the coated optical fiber 19 onto the center axis of the optical fiber holding groove 8 in the splice member 4 and that the right guide block 91 has a lid portion 94 for preventing the coated optical fiber 19 from being disengaged from the coated fiber guide groove 93.

In the fiber insertion guide 89 of this embodiment, however, the coated fiber guide groove 93 is in an upwardly-open form, and the lid portion 94 is so constructed as to open and close the upper side of the coated fiber guide groove 93 in accordance with a grasping operation for a pair of grasp frames 33, 35 as shown in FIGS. 26(a) and 26(b).

In the case of this form, also, similar effects and advantages to those of the third embodiment can be obtained.

FIGS. 27 to 30 show a fifth embodiment of an optical fiber connection jig of the present invention. In this embodiment, the showing of one grasp frame 33 of a pair of grasp frames 33, 35 is omitted.

In the optical fiber connection jig 125 of this embodiment, a fiber insertion guide 127 is detachably provided at a front surface of a jig body 31.

This fiber insertion guide 127 is similar to that of the first embodiment in that this fiber insertion guide has a coated fiber insertion groove 129 of the upwardly-open type and that this fiber insertion guide is detachably mounted on the jig body 31 by a screw.

However, the coated fiber guide groove 129 of this embodiment is set to a width dimension b2 (for example, 0.125 mm$\phi$ in corresponding relation to the optical fiber 20) for enabling the optical fiber 20 (made bare at the coated optical fiber 19) to slide, and is open to a position slightly deviated from the center axis Y1 of the optical fiber holding groove 8 of the splice member 4 in a left-right direction, and is slanting from this open position toward a groove bottom thereof, and the bottom of the groove extends along the center axis Y1 of the optical fiber holding groove 8 in the splice member 4. The optical fiber 20 is inserted into the coated fiber guide groove 129 through the upper opening thereof, and is moved to the bottom of this groove, and then is slid on the bottom of the groove in the direction of the axis of the splice member 4, and is guide into the optical fiber holding groove 8 in the splice member 4.

In order that the optical fiber 20, when sliding on the coated fiber guide groove 129 during the insertion of the optical fiber 20, can be prevented from being damaged, preferably, a spacing distance L6 between the fiber insertion guide 127 and the open end of the optical fiber holding groove 8 in the splice member 8 is so determined that the two are disposed close to each other, thereby narrowing the area of movement of the optical fiber 20.

In the optical fiber connection jig 125 described above, the coated fiber guide groove 129 of the fiber insertion guide 127 is in the slantingly-open form, and the optical fiber 20 is moved along slanting surfaces of the coated fiber guide groove 129 to be disposed at the bottom of the groove, and with this construction one wall surface of the slanting surfaces serves as a lid portion, thereby avoiding a disadvantage that the optical fiber 20 is disengaged from the coated fiber guide groove 129, and the reliability of the jig and efficiency of the connecting operation can be enhanced.

And besides, the fiber insertion guide 127 is formed into a shape extending long from the front surface of the jig body 31 to the splice member 4 held in a splice holder 37, and the visibility of the coated fiber guide groove 129 for the sliding movement of the optical fiber 20 thereon is good, so that the efficiency of the connecting operation can be further enhanced.

Figure 31:
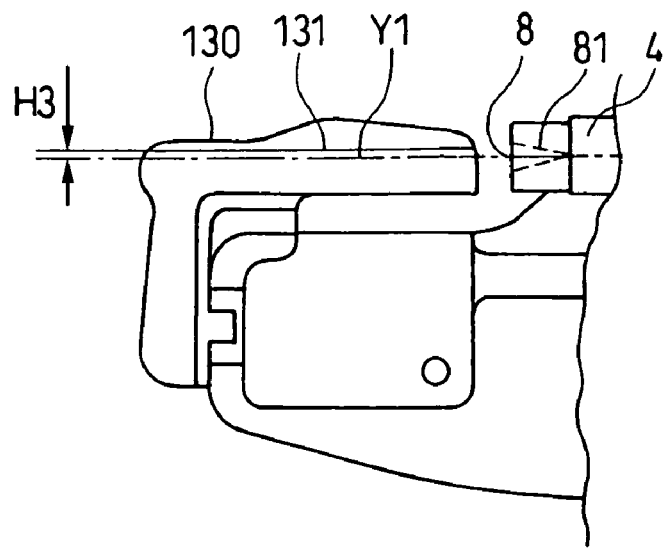
FIG. 31 is an enlarged view of a fiber insertion guide of a further embodiment of an optical fiber jig of the present invention.
Figure 32:
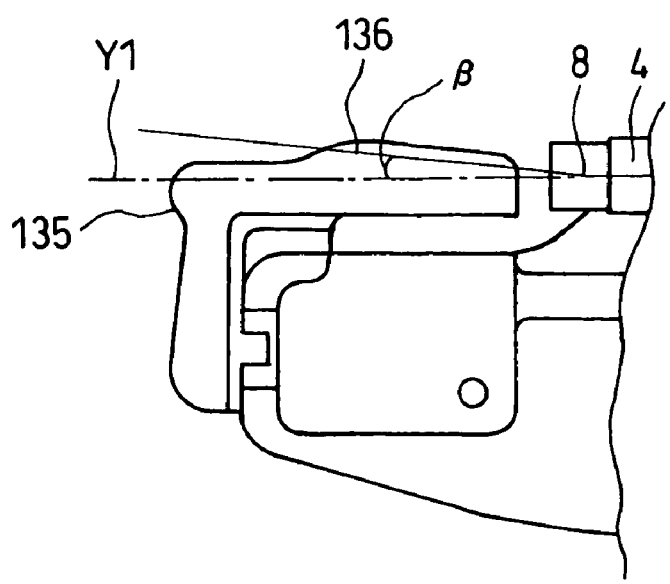
FIG. 32 is an enlarged view of a fiber insertion guide of a further embodiment of an optical fiber jig of the present invention.

FIGS. 31 and 32 show further embodiments of fiber insertion guides of the present invention, respectively.

The fiber insertion guides 130, 135 of FIGS. 31 and 32 are similar to that of the above fifth embodiment in that these fiber insertion guides have respective coated fiber guide grooves 131, 136 of the upwardly-open type extending along the center axis Y1 of the optical fiber holding groove 8 in the splice member 4 and that each fiber insertion guide is detachably mounted on a jig body 31 by a screw.

In the embodiment of FIG. 31, however, the coated fiber guide groove 131 is slightly upwardly offset a predetermined distance H3 from the center axis Y1 of the optical fiber holding groove 8, and in this structure, the sliding optical fiber 20 moves along a tapering surface 81 open to the optical fiber holding groove 8, and is guided into the optical fiber holding groove 8.

In the embodiment of FIG. 32, the coated fiber guide groove 136 is inclined at a predetermined angle $\beta$ with respect to the center axis Y1 of the optical fiber holding groove 8, and the optical fiber 20 is obliquely inserted into the optical fiber holding groove 8 from the upper side.

Preferably, the above offset amount H3 is about 1 mm, and the inclination angle $\beta$ is about 5° to about 10°.

In the case of these embodiments, when the optical fiber 20 is slid on the coated fiber guide groove 131, 136 to be inserted into the optical fiber holding groove 8, the sliding movement of the optical fiber 20 can be effected smoothly, so that the good insertability can be obtained.

Figure 33:
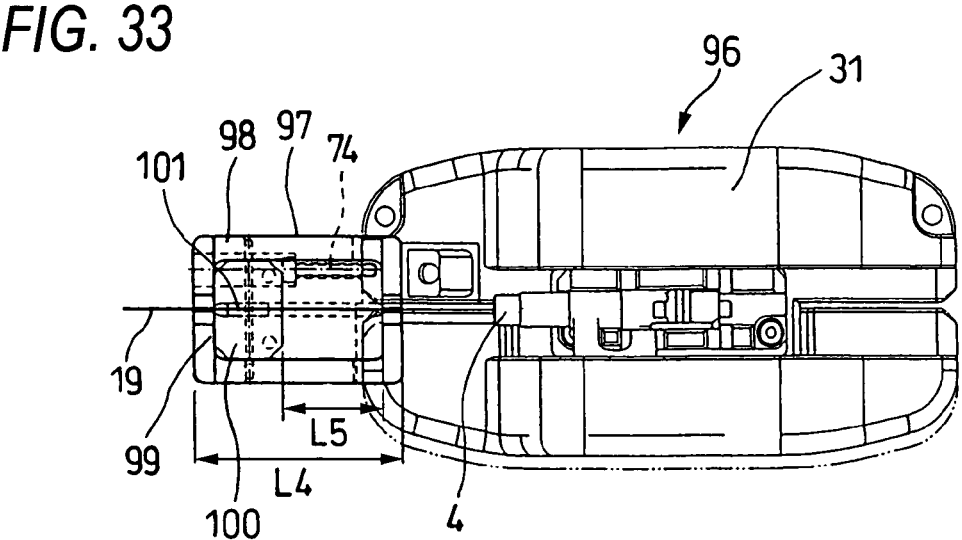
FIG. 33 is a plan view of a sixth embodiment of an optical fiber connection jig of the present invention.
Figure 34:
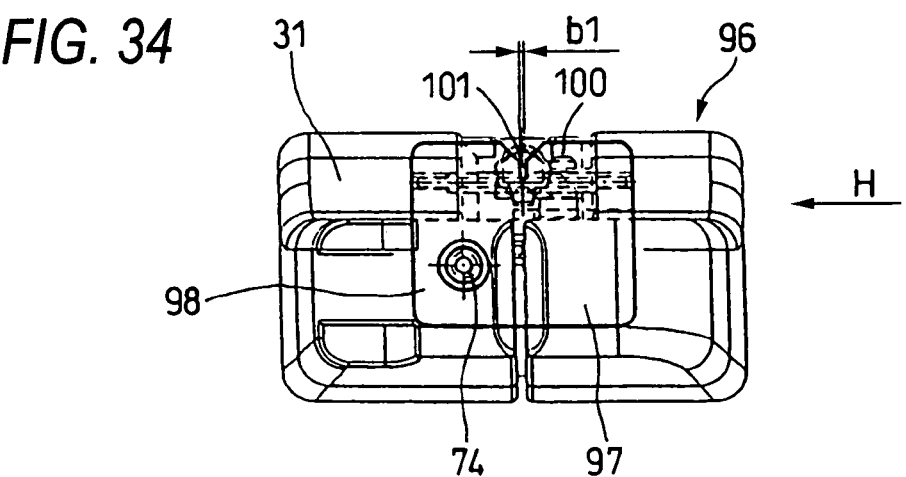
FIG. 34 is a front-elevational view of the optical fiber connection jig shown in FIG. 33.
Figure 35:
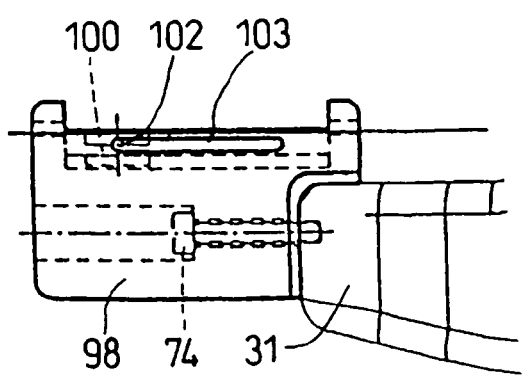
FIG. 35 is a view as seen in a direction of arrow H of FIG. 34.

FIGS. 33 to 35 show a sixth embodiment of an optical fiber connection jig of the present invention.

In the optical fiber connection jig 96 of this embodiment, a fiber insertion guide 97, detachably mounted on a front surface of a jig body 31 by a screw 74, comprises a guide block body 98 fixed to a grasp frame 35 by the screw 74, and a coated fiber guide block 100 supported on the guide block body 98 through a slide mechanism 99 so as to move along the direction of the center axis Y1 of the optical fiber holding groove 8. A coated fiber guide groove 101 for guiding the coated optical fiber 19 onto the center axis of the optical fiber holding groove 8 in the splice member 4 held in the jig body 31 is formed in the coated fiber guide block 100.

In the case of this embodiment, the coated fiber guide groove 101 is an upwardly-open groove, and a width of a bottom portion of the groove is set to a value corresponding to the outer shape of the coated optical fiber 19 to be guided, and therefore is set to b1 as in the above embodiments.

In the slide mechanism 99, a pin 102, projecting laterally from the coated fiber guide block 100, is fitted in a slot 103 formed in the guide block body 98 and extending long in the direction of the axis of the optical fiber holding groove 8, as shown in FIG. 35.

As shown in FIG. 33, the guide block body 98 has an overall length L4, while a length of sliding of the coated fiber guide block 100 is L5. This sliding length L5 is set in corresponding relation to a length of insertion of the optical fiber 20 of the coated optical fiber 19 to be connected to the splice member 4.

Thus, there is provided the construction in which the coated fiber guide block 100, having the coated fiber guide groove 101, is movable along the center axis of the optical fiber holding groove 8 in the splice member 4, and by moving the coated fiber block 100 having the coated optical fiber 19 held thereon, the sliding movement at the time of connecting the optical fiber to the splice member 4 can be effected smoothly, and at the same time the amount of the movement is limited to a proper value, thereby preventing a disadvantage that the optical fiber is forcibly inserted, and therefore the efficiency of the operation is further enhanced.

Figure 36:
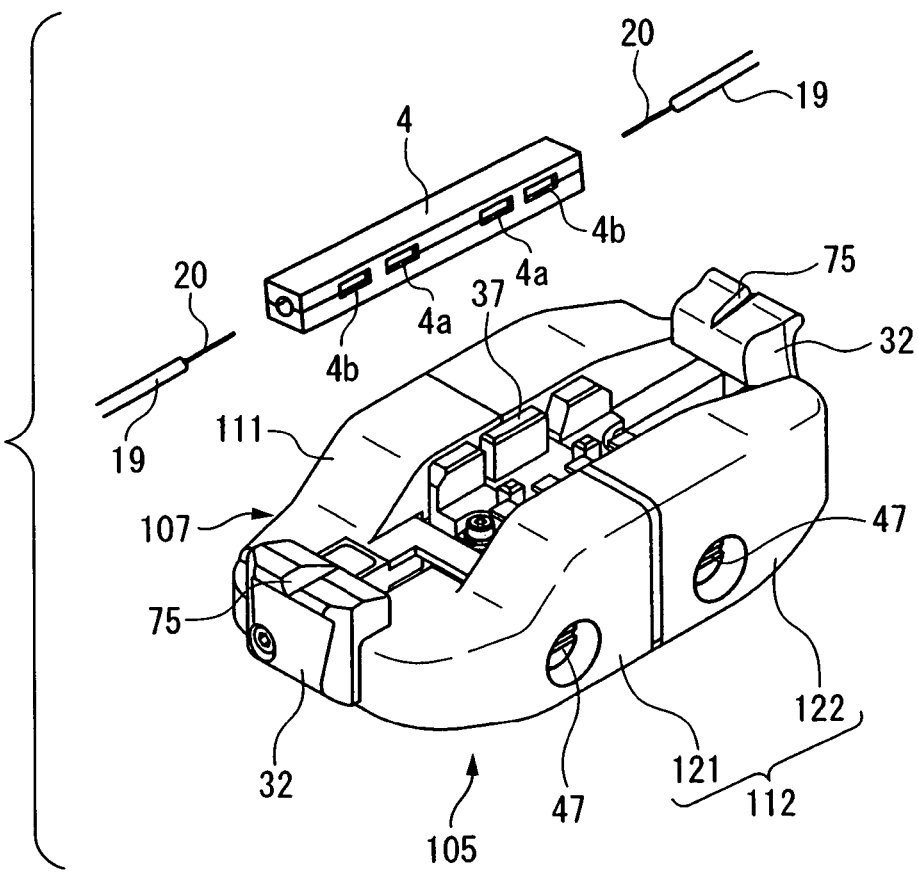
FIG. 36 is a perspective view of a seventh embodiment of an optical fiber connection jig of the present invention.
Figure 37:
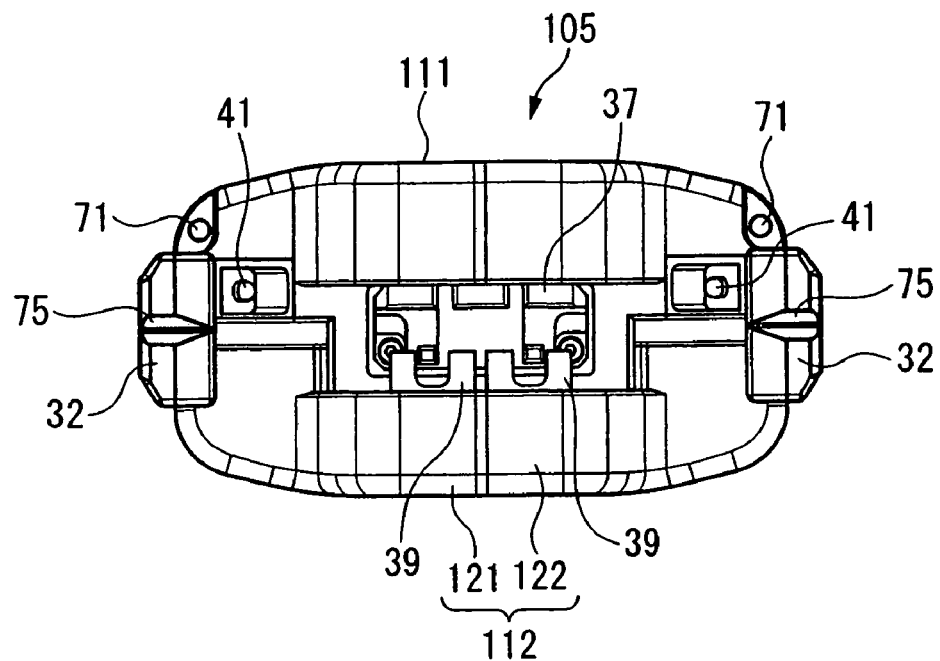
FIG. 37 is a plan view of the optical fiber connection jig shown in FIG. 36.
Figure 38:
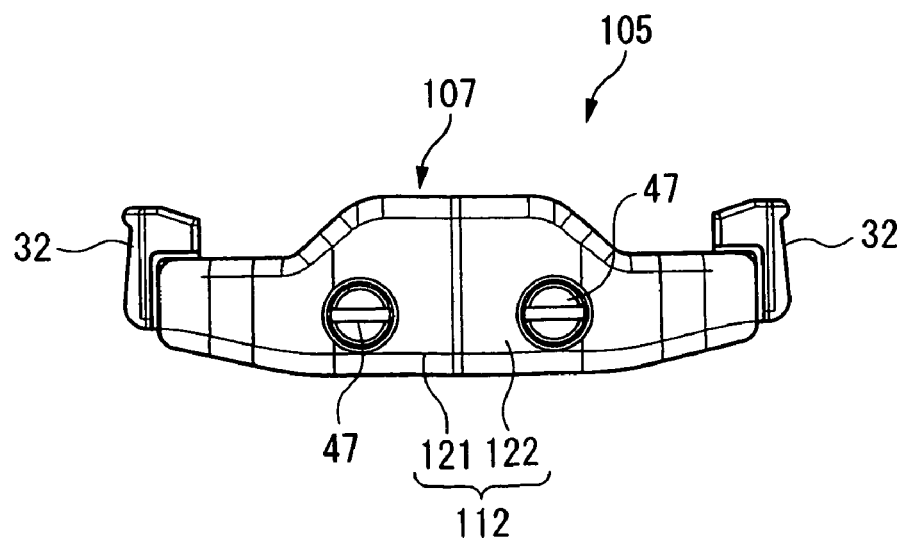
FIG. 38 is a right side-elevational view of the optical fiber connection jig shown in FIG. 36.

FIGS. 36 to 38 show a seventh embodiment of an optical fiber connection jig of the present invention.

The optical fiber connection jig 105 of this embodiment is used not for connecting the coated optical fiber 19 to the splice member 4 incorporated in the mechanical splice-type connector 1 but for connecting coated optical fibers 19 respectively to optical fiber holding grooves 8 formed respectively in opposite (front and rear) end portions of a single splice member 4 as shown in FIG. 36.

Therefore, fiber insertion guides 32 each for guiding the coated optical fiber 19 into the optical fiber holding groove 8 are provided respectively at opposite (front and rear) ends of a jig body 107 for holding the splice member 4, and further illumination means 41 for respectively illuminating regions disposed respectively around the optical fiber holding grooves 8 are provided at the front and rear ends of the jig body 107, respectively. The fiber insertion guides 32 and the illumination means 41 are the same as those provided at the jig body 31 of the first embodiment, and therefore explanation thereof will be omitted.

The jig body 107 is similar to that of each of the above embodiments in that this jig body 107 comprises a pair of left and right grasp frames 111, 112 opposed to each other with a splice holder 37 (for holding the splice member 4) interposed therebetween and that when the pair of grasp frames 111, 112 are grasped, wedge pieces 39 are fitted into respective wedge insertion slits 4a, 4b in the splice member 4 to forcibly expand the optical fiber holding grooves 8.

However, the wedges pieces 39 are provided at the front and rear portions of the jig body 107 of this embodiment in corresponding relation to the optical fiber holding grooves 8 provided respectively in the front and rear end portions of the splice member 4 as shown in FIG. 37. Further, in order that each wedge piece 39 can be pushed into the wedge insertion slits 4a, 4b in accordance with the grasping operation, the right grasp frame 112 is divided into a pair of front and rear division grasp frames 121, 122 in corresponding relation to the pair of front and rear wedge pieces 39.

The division grasp frames 121, 122 can be similar to the construction of the first embodiment in that these division grasp frames are supported by respective guide shafts 47 so as to be moved toward the grasp frame 111 to which these division grasp frames are opposed.

In the optical fiber connection jig 105 of this construction, when the coated optical fibers 19 are to be sequentially connected respectively to the optical fiber holding grooves 8 provided respectively in the opposite end portions of the splice member 4, first, the coated optical fiber is inserted into the optical fiber holding groove 8 in one end portion of the splice member 4, and thereafter the coated optical fiber is inserted into the optical fiber holding groove 8 in the other end portion of the splice member 4. As described above, there is provided the construction in which the wedge pieces 39 can be fitted into the respective optical fiber holding grooves 8 (provided respectively in the opposite end portions of the splice member 4) independently of each other thanks to the provision of the pair of front and rear division grasp frames 121, 122, and therefore there is no fear that the optical fiber holding groove 8, having the coated optical fiber already connected thereto, is expanded during the connecting operation for the subsequently-applied coated optical fiber, and therefore the already-connected coated optical fiber will not be withdrawn. In the case where the coated optical fibers are sequentially connected respectively to the optical fiber holding grooves 8 provided respectively in the opposite end portions of the splice member 4, also, the excellent handleability and the positive operation can be obtained.

Figure 39:
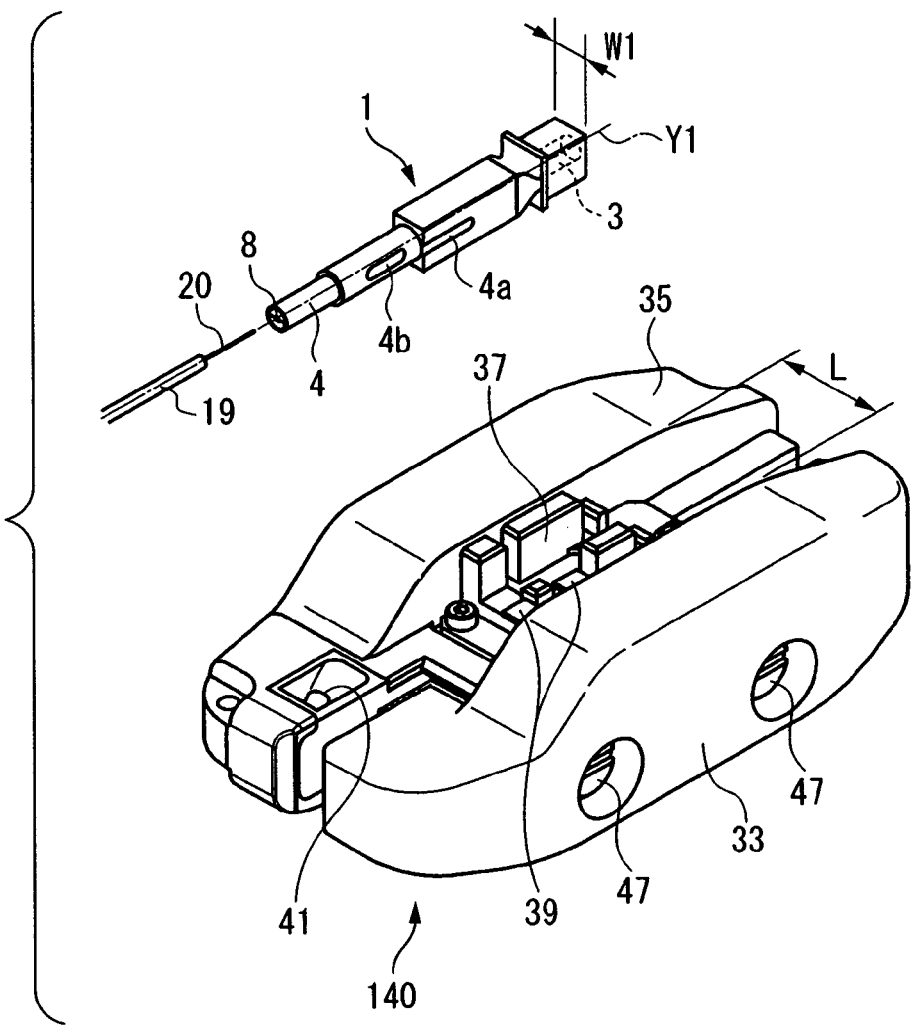
FIG. 39 is a perspective view showing an eighth embodiment of an optical fiber connection jig of the present invention.

FIG. 39 shows an eighth embodiment of an optical fiber connection jig of the present invention.

The optical fiber connection jig 140 of this embodiment is one in which the provision of the fiber insertion guide of the optical fiber connection jig of the first embodiment is omitted, and the other construction is the same as that of the first embodiment, and therefore identical portions will be designated by identical reference numerals, respectively, and will be briefly described.

The optical fiber connection jig 140 of this embodiment comprises a pair of left and right grasp frames 33, 35 which are spaced a predetermined spacing distance from each other in opposed relation to each other, and can be displaced toward each other when these grasp frames are grasped in the palm, a splice holder 37 which is disposed between these grasp frames 33, 35 so as to locate and fix a loaded splice member 4 in a predetermined position, and a pair of wedge pieces 39 which are formed on and project from an inner side surface of one grasp frame 33 for being opposed to wedge insertion slits 4a, 4b in a side surface of the splice member 4 fixed to the splice holder 37, and are fitted respectively into the wedge insertion slits 4a, 4b to forcibly expand an optical fiber holding groove 8 when the pair of grasp frames 33, 35 are grasped to be moved toward each other.

The wedge pieces 39, illumination means 41, the splice holder 37 and so on are similar in construction respectively to those of the first embodiment.

Even with respect to the optical fiber connection jig 140 thus not provided with the fiber insertion guide, the jig itself can be received in the palm, and the connection of the optical fiber 20 can be easily carried out with the one-hand grasping operation at the field or the like, and therefore the operation for connecting the optical fiber 20 to the mechanical splice-type connector 1 at the field can be effected easily.

And besides, the omission of the fiber insertion guide contributes to a simplified and small-size design of the structure, so that the production cost can be reduced.

Although the present invention has been described in detail by way of the specific embodiments, it will be obvious to those skilled in the art that various changes and modifications can be added without departing from the spirits and scope of the present invention.

INDUSTRIAL APPLICABILITY

As described above, the optical fiber connection jig of the present invention is formed into such a small size as to be received in the palm, and is small in size and lightweight, and is excellent in portability, and besides enables the mechanical splice-type connector to be easily connected to the optical fiber, so that it is expected that this jig much contributes to the development of FTTH (Fiber to the home). In addition, the jig can be produced at a low cost since its structure is simple.

Furthermore, the fiber insertion guide, provided on the jig body, locates the coated optical fiber on the center axis of the optical fiber holding groove by the coated fiber guide groove, and therefore when the optical fiber is to be inserted into the optical fiber holding groove in the splice member, the optical fiber can be easily and positively inserted into the optical fiber holding groove without imposing any burden of alignment or others on the operator, and the operation for connecting the optical fiber through the splice member at an optical fiber installation field can be easily carried out.

Furthermore, with respect to the form of splice member to which the coated optical fiber is connected, the splice member can be used alone, and also can be used in a condition in which the splice member is assembled as the mechanical splice-type connector. For example, even in the case where a sufficient extra length of a cable for the connection of the mechanical splice-type connector is not obtained at an optical fiber installation field, the connecting operation can be easily effected by bringing the jig into registry with a connector-connecting position, and because of excellent handleability at the field, an increasing demand for the mechanical splice-type connector itself can be expected.

The invention claimed is:

1. An optical fiber connection jig used for inserting a coated optical fiber into an optical fiber holding groove in a splice member, characterized in that:

said jig comprises a jig body having a wedge piece which is advanced by a grasping operation, and is fitted into a wedge insertion slit in said splice member to forcibly expand said optical fiber holding groove, a fiber insertion guide which is mounted on said jig body, and guides said coated optical fiber generally onto a center axis of said optical fiber holding groove by a coated fiber guide groove, a pair of grasp frames which are spaced a predetermined distance from each other in opposed relation to each other, and can be displaced toward each other by a grasping operation, and at least one guide shaft positioned to guide the grasp frames towards each other.

2. An optical fiber connection jig according to claim 1, characterized in that said jig body comprises a pair of front and rear wedge pieces provided in corresponding relation respectively to optical fiber holding grooves formed respectively in front and rear end portions of said splice member, and a pair of front and rear division grasp frames which are separated from each other in a front-rear direction so that each of said wedge pieces can be independently forced into said wedge insertion slit by the grasping operation.

3. An optical fiber connection jig according to claim 1, characterized in that said fiber insertion guide has said coated fiber guide groove which is spaced a predetermined distance from an open end of said optical fiber holding groove of said splice member in a direction of the center axis of said optical fiber holding groove, and said coated optical fiber is slid on said coated fiber guide groove, so that an optical fiber, made bare at a distal end portion of the coated optical fiber, is inserted and guided into said optical fiber holding groove.

4. An optical fiber connection jig according to claim 1, characterized in that said coated fiber guide groove of said fiber insertion guide is set to a size corresponding to a diameter of the fiber to be connected to said splice member, and said fiber insertion guide is detachably mounted on said jig body.

5. An optical fiber connection jig according to claim 1, characterized in that said fiber insertion guide is made of a transparent material.

6. An optical fiber connection jig according to claim 1, characterized in that a lid portion for preventing the coated optical fiber from being disengaged from said coated fiber guide groove during the insertion of the coated optical fiber into said optical fiber holding groove is provided at said fiber insertion guide.

7. An optical fiber connection jig according to claim 1, characterized in that said fiber insertion guide includes a slide mechanism by which a coated fiber guide block, having said coated fiber guide groove therein, can be moved along the direction of the center axis of said optical fiber holding groove.

8. An optical fiber connection jig according to claim 1, characterized in that said jig is provided with illumination means for illuminating a region around said optical fiber holding groove when the optical fiber is to be inserted into said optical fiber holding groove in said splice member.

9. An optical fiber connection jig according to claim 1, characterized in that said jig body is provided with an illumination lighting switch for causing said illumination means to be lighted soon after the grasping operation for said jig body is started so as to fit said wedge piece into said wedge insertion slit in a side surface of said splice member.

10. An optical fiber connection jig according to claim 9, characterized in that said jig body includes a pair of left and right grasp frames which are disposed in opposed relation to each other with the splice member interposed therebetween, and can be displaced toward each other by the grasping operation, and said illumination lighting switch has a structure employing leaf springs whose contacts are brought into contact with each other when a spacing distance between said pair of left and right grasp frames, approaching each other, becomes smaller than a predetermined length.

11. An optical fiber connection jig according to claim 1, characterized in that a mechanical splice-type connector, holding a ferrule, is used as said splice member for connecting said coated optical fiber.

12. An optical fiber connection jig used for inserting a coated optical fiber into an optical fiber holding groove in a splice member, characterized in that:

said jig comprises a pair of grasp frames which are spaced a predetermined distance from each other in opposed relation to each other, and can be displaced toward each other by a grasping operation, a splice holder which is provided between said grasp frames so as to position and fix said splice member, a wedge piece which is formed on and projects from one of said grasp frames for being opposed to a wedge insertion slit in a side surface of said splice member fixed to said splice holder, and is fitted into said wedge insertion slit to forcibly expand said optical fiber holding groove when the grasping operation for said grasp frames is effected, and at least one guide shaft positioned to guide the grasp frames towards each other.

13. The optical fiber connection jig of claim 12, further comprising at least one spring member positioned to compress when the grasp frames move towards each other.

14. The optical fiber connection jig of claim 1, further comprising at least one spring member positioned to compress when the grasp frames move towards each other.

* * * * *